United States Patent
Nakatani et al.

(10) Patent No.: US 6,874,315 B2
(45) Date of Patent: Apr. 5, 2005

(54) EXHAUST GAS PURIFICATION DEVICE

(75) Inventors: Koichiro Nakatani, Susono (JP); Shinya Hirota, Susono (JP); Kazuhiro Itoh, Mishima (JP); Takamitsu Asanuma, Susono (JP); Koichi Kimura, Susono (JP); Kiyoshi Nakanishi, Susono (JP); Toshiaki Tanaka, Numazu (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 102 days.

(21) Appl. No.: 09/979,643
(22) PCT Filed: Nov. 26, 2001
(86) PCT No.: PCT/JP01/02506
 § 371 (c)(1),
 (2), (4) Date: Nov. 26, 2001
(87) PCT Pub. No.: WO01/73271
 PCT Pub. Date: Oct. 4, 2001

(65) Prior Publication Data
 US 2002/0157385 A1 Oct. 31, 2002

(30) Foreign Application Priority Data
 Mar. 27, 2000 (JP) .................................. 2000-090746
 Apr. 28, 2000 (JP) .................................. 2000-131595

(51) Int. Cl.[7] .............................................. F01N 3/00
(52) U.S. Cl. ........................ 60/285; 60/296; 60/297; 60/311; 60/312
(58) Field of Search ................. 60/285, 286, 295, 60/296, 297, 311, 312; 55/DIG. 30; 123/90.15

(56) References Cited

U.S. PATENT DOCUMENTS

| 4,730,454 | A | * | 3/1988 | Pischinger et al. | ........... 60/311 |
|---|---|---|---|---|---|
| 4,902,487 | A | | 2/1990 | Cooper et al. | |
| 4,934,142 | A | * | 6/1990 | Hayashi et al. | ................ 60/297 |
| 5,100,632 | A | | 3/1992 | Dettling et al. | |
| 5,123,243 | A | * | 6/1992 | Baddour | ....................... 60/274 |
| 5,253,476 | A | * | 10/1993 | Levendis et al. | .............. 60/279 |
| 5,566,545 | A | * | 10/1996 | Hijikata et al. | ................ 60/311 |
| 5,853,438 | A | * | 12/1998 | Igarashi | ....................... 60/296 |
| 6,167,696 | B1 | * | 1/2001 | Maaseidvaag et al. | ......... 60/311 |
| 6,233,926 | B1 | * | 5/2001 | Bailey et al. | .................. 60/297 |
| 6,314,722 | B1 | * | 11/2001 | Matros et al. | ................. 60/296 |
| 6,367,246 | B1 | * | 4/2002 | Hirota et al. | .................. 60/297 |

FOREIGN PATENT DOCUMENTS

| EP | 0 984 142 A1 | 8/2000 |
|---|---|---|
| JP | 58-137423 A | 8/1983 |
| JP | 59-30507 | 2/1984 |
| JP | 60-235620 | 11/1985 |
| JP | 61-28709 A | 12/1986 |
| JP | 56148607 | 11/1991 |
| JP | 03271515 | 12/1991 |
| JP | 04031614 A | 3/1992 |
| JP | 5-44436 | * 2/1993 |

(Continued)

OTHER PUBLICATIONS

A Device For Purifying The Exhaust Gas Of An Internal Combustion Engine; U.S. Appl. No. 09/979,262.
A Device For Purifying The Exhaust Gas Of An Internal Combustion Engine; U.S. Appl. No. 09/817,187.
A Device For Purifying The Exhaust Gas Of An Internal Combustion Engine; U.S. Appl. No. 09/904,875.

Primary Examiner—Tu M. Nguyen
(74) Attorney, Agent, or Firm—Oliff & Berridge, PLC

(57) ABSTRACT

A particulate filter (22) for removing particulates included in an exhaust gas discharged from a combustion chamber (5) is arranged in an engine exhaust passage. The particulate filter has wall partitions (54) which the exhaust gas can pass through. The particulates included in the exhaust gas are removed by oxidation in the interior of the partitions. The particulates are fluidized in the interior of the partitions.

30 Claims, 17 Drawing Sheets

FOREIGN PATENT DOCUMENTS

| | | |
|---|---|---|
| JP | 5-98932 A | 4/1993 |
| JP | 05179928 | 7/1993 |
| JP | 6-159037 A | 6/1994 |
| JP | 6-272541 A | 9/1994 |
| JP | 07180536 A | 7/1995 |
| JP | 7-189655 A | 7/1995 |
| JP | 7-189656 A | 7/1995 |
| JP | 7-106290 B2 | 11/1995 |
| JP | 8-338229 A | 12/1996 |
| JP | 9-94434 A | 4/1997 |
| JP | 10-220218 A | 8/1998 |
| JP | 10-306717 A | 11/1998 |
| JP | 11-300165 A | 11/1999 |
| JP | 3012249 B2 | 12/1999 |
| JP | 11-336534 A | 12/1999 |
| JP | 2000-18026 A | 1/2000 |
| WO | WO 00/42302 | 7/2000 |

\* cited by examiner

EXHAUST GAS

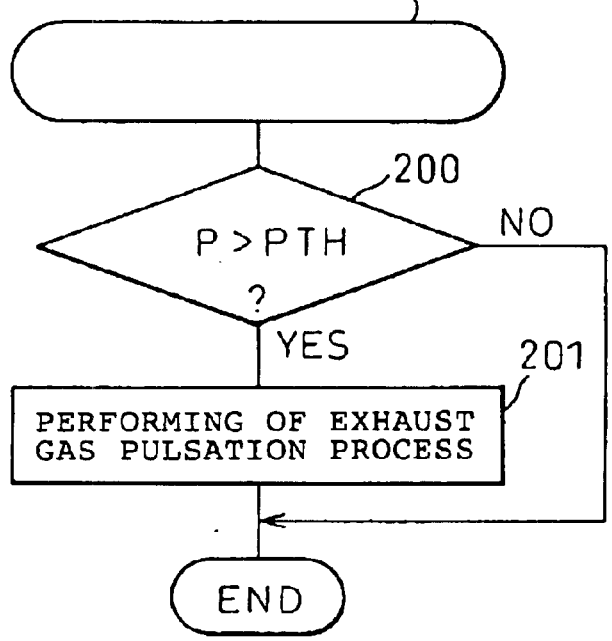
Fig.13 PROCESS FOR REMOVING DEPOSITING PARTICULATES BY OXIDATION
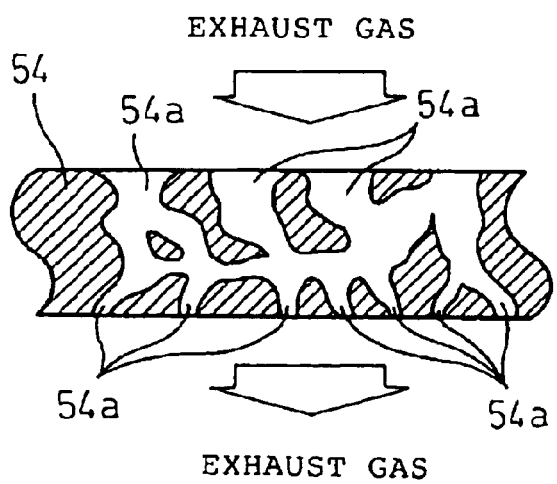
Fig.14

Fig.15
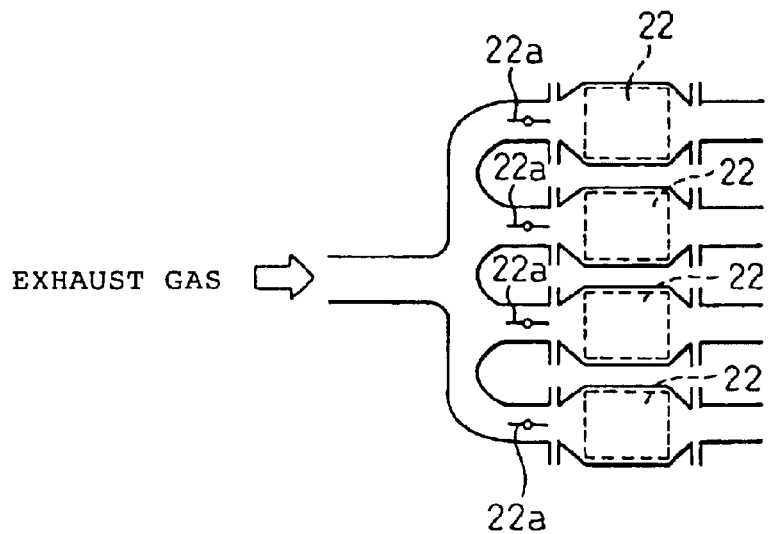
Fig.16 PROCESS FOR REMOVING DEPOSITING PARTICULAT BY OXIDATION
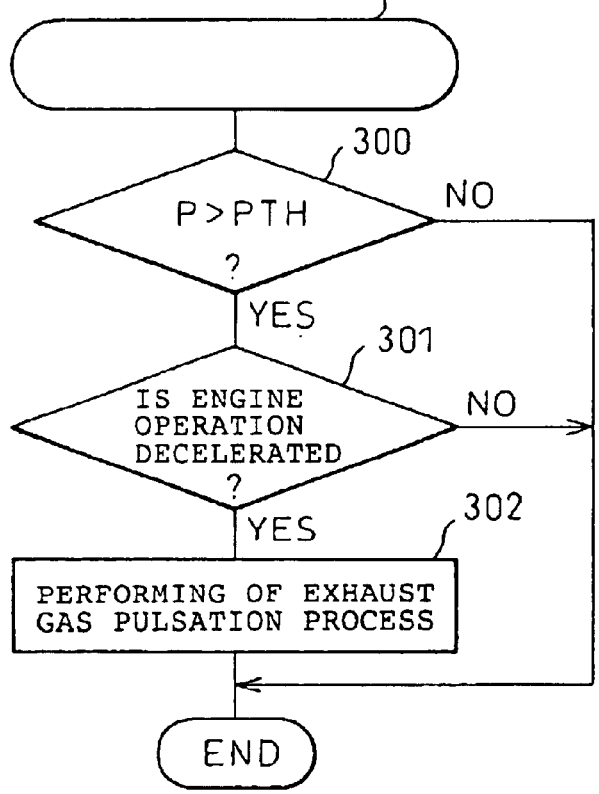

EXHAUST GAS PURIFICATION DEVICE

TECHNICAL FIELD

The present invention relates to an exhaust gas purification device.

BACKGROUND ART

In the related art, in a diesel engine, particulates contained in the exhaust gas are removed by arranging a particulate filter in the engine exhaust passage, using the particulate filter to trap the particulates in the exhaust gas, and igniting and burning the particulates trapped on the particulate filter to renew the particulate filter.

The particulates trapped on the particulate filter, however, do not ignite unless the temperature becomes higher than about 600° C., but, opposed to this, the temperature of the exhaust gas of a diesel engine is normally considerably lower than 600° C. Therefore, it is difficult to use the heat of the exhaust gas to cause the particulates trapped on the particulate filter to ignite and burn. Therefore, the particulates deposit on the particulate filter, and thus, the amount of the particulates removable by the particulate filter per unit time becomes small.

In an exhaust gas purification device comprising a particulate filter, the object of the invention is to keep an ability to remove the particulates, by the particulate filter, per unit time high.

DISCLOSURE OF INVENTION

To accomplish the above object, according to the first invention, there is provided an exhaust gas purification device wherein a particulate filter, for removing particulates included in an exhaust gas discharged from a combustion chamber, is arranged in an engine exhaust passage, the particulate filter has wall partitions, through which the exhaust gas flows, an oxidizing material for oxidizing the particulates is carried in an interior of the partitions, the particulates included in the exhaust gas are removed by oxidation in the interior of the partitions, and the device comprises means for desorbing and fluidizing the particulates held in the interior of the partitions.

In the second invention according to the first invention, the oxidizing material has a function to release an active oxygen therefrom.

In the third invention according to the second invention, the oxidizing material has a function to absorb and hold an oxygen therein when excess oxygen is present in the surroundings, and release active oxygen therefrom when the particulates adsorb to wall surfaces of the partitions.

In the fourth invention according to the second invention, the oxidizing material has a function to absorb and hold oxygen therein if excess oxygen is present in the surroundings, and release the held oxygen in the form of active oxygen therefrom if a concentration of the oxygen in the surroundings falls.

In the fifth invention according to the fourth invention, the oxidizing material is comprised of at least one of an alkali metal, an alkali earth metal, a rare earth, a transition metal, and a carbon family element.

In the sixth invention according to the fifth invention, the alkali metal and alkali earth metal are comprised of metals higher in ionization tendency than calcium.

In the seventh invention according to the fourth invention, the particulates are oxidized by temporarily making an air-fuel ratio of a part or all of the exhaust gas rich.

In the eighth invention according to the first invention, the oxidizing material is comprised of a precious metal catalyst.

In the ninth invention according to the first invention, the particulate fluidizing means fluidizes the particulates by changing a flowing characteristic of the exhaust gas in the interior of the partitions.

In the tenth invention according to the third invention, the particulate fluidizing means fluidizes the particulates by pulsing the exhaust gas and introducing the pulsed exhaust gas into the partitions.

In the eleventh invention according to the tenth invention, the particulate fluidizing means pulses the exhaust gas by creating parts having different pressures in the exhaust gas.

In the twelfth invention according to the eleventh invention, the particulate fluidizing means creates the parts having different pressures in the exhaust gas by supplying fuel and air into the engine exhaust passage and reacting the fuel with the air.

In the thirteenth invention according to the tenth invention, the device comprises a plurality of the particulate filters which are arranged parallel to each other, the particulate fluidizing means pulses the exhaust gas by decreasing an amount of the exhaust gas flowing into at least one of the particulate filters and increasing an amount of the exhaust gas flowing into the remaining particulate filters.

In the fourteenth invention according to the tenth invention, the particulate fluidizing means pulses the exhaust gas by changing operational parameters of an engine.

In the fifteenth invention according to the fourteenth invention, the particulate fluidizing means changes the operational parameters of the engine to inject and burn additional fuel after the fuel for driving the engine is injected.

In the sixteenth invention according to the fourteenth invention, the particulate fluidizing means changes the operational parameters of the engine to advance a time to open an exhaust valve.

In the seventeenth invention according to the ninth invention, the particulate fluidizing means fluidizes the particulates by reversing a flow direction of the exhaust gas flowing in the interior of the partitions.

In the eighteenth invention according to the seventeenth invention, the particulate fluidizing means reverses the flow direction of the exhaust gas flowing in the interior of the partitions without switching an exhaust gas inflow side of the particulate filter and an exhaust gas outflow side of the particulate filter.

In the nineteenth invention according to the seventeenth invention, the particulate fluidizing means reverses the flow direction of the exhaust gas flowing in the interior of the partitions by switching an exhaust gas inflow side of the particulate filter and an exhaust gas outflow side of the particulate filter.

In the twentieth invention according to the first invention, the particulate fluidizing means fluidizes the particulates by vibrating the particulate filter.

In the twenty-first invention according to the twentieth invention, the particulate fluidizing means vibrates the particulate filter by an ultrasonic vibrator.

In the twenty-second invention according to the twenty-first invention, the particulate fluidizing means supports the particulate filter such that the particulate filter can vibrate.

In the twenty-third invention according to the twenty-first invention, the particulate fluidizing means vibrates the particulate filter by vibrating an engine.

In the twenty-fourth invention according to the first invention, the particulate fluidizing means fluidizes the particulates when it is expected that the particulates will deposit on the particulate filter.

In the twenty-fifth invention according to the first invention, the particulate fluidizing means desorbs and fluidizes the particulates depositing in the partitions when it is detected that the particulates deposit on the particulate filter.

In the twenty-sixth invention according to the first invention, the particulate fluidizing means fluidizes the particulates at predetermined time intervals.

In the twenty-seventh invention according to the first invention, the partitions are formed from a porous material.

In the twenty-eighth invention according to the twenty-seventh invention, the average sizes of fine holes of the partitions at the exhaust gas inflow side are larger than those at the exhaust gas outflow side.

In the twenty-ninth invention according to the first invention, a plurality of the partitions are arranged in parallel with each other to form a plurality of exhaust circulation passages extending in parallel with each other in the particulate filter, one of the adjacent exhaust circulation passages is closed at an upstream end thereof by a plug and the other of the adjacent exhaust circulation passages is closed at a downstream end thereof by a plug.

In the thirtieth invention according to the first invention, the particulate filter is used to remove the particulates included in the exhaust gas flowing into the particulate filter by oxidation without emitting a luminous flame when an amount of the particulates discharged from the combustion chamber per unit time is smaller than an amount of particulates removable by oxidation per unit time on the particulate filter without emitting a luminous flame, and to remove the particulates included in the exhaust gas flowing into the particulate filter by oxidation without emitting a luminous flame when the amount of discharged particulates becomes smaller than the amount of particulates removable by oxidation if an amount of particulates depositing on the particulate filter is smaller than a certain level even when the amount of discharged particulates becomes temporarily larger than the amount of particulates removable by oxidation, the amount of particulates removable by oxidation depends on a temperature of the particulate filter, means is provided for maintaining the amount of the discharged particulates and the temperature of the particulate filter such that the amount of discharged particulates is normally smaller than the amount of particulates removable by oxidation and such that the amount of particulates depositing on the particulate filter is smaller than the certain level so as to remove the particulates by oxidation if the amount of discharged particulates becomes smaller than the amount of particulates removable by oxidation even when the amount of discharged particulates temporarily becomes larger than the amount of particulates removable by oxidation, thereby removing the particulates included in the exhaust gas by oxidation on the particulate filter without emitting a luminous flame.

BRIEF DESCRIPTION OF DRAWINGS

FIG. 13 is a flowchart of removing the depositing particulates by oxidation;

FIG. 14 is a sectional view of partition of the particulate filter;

FIG. 15 is a view of a plurality of the particulate filters arranged parallel to each other;

FIG. 16 is a flowchart of removing the depositing particulates by oxidation;

BEST MODE FOR CARRYING OUT THE INVENTION

Figure 1:
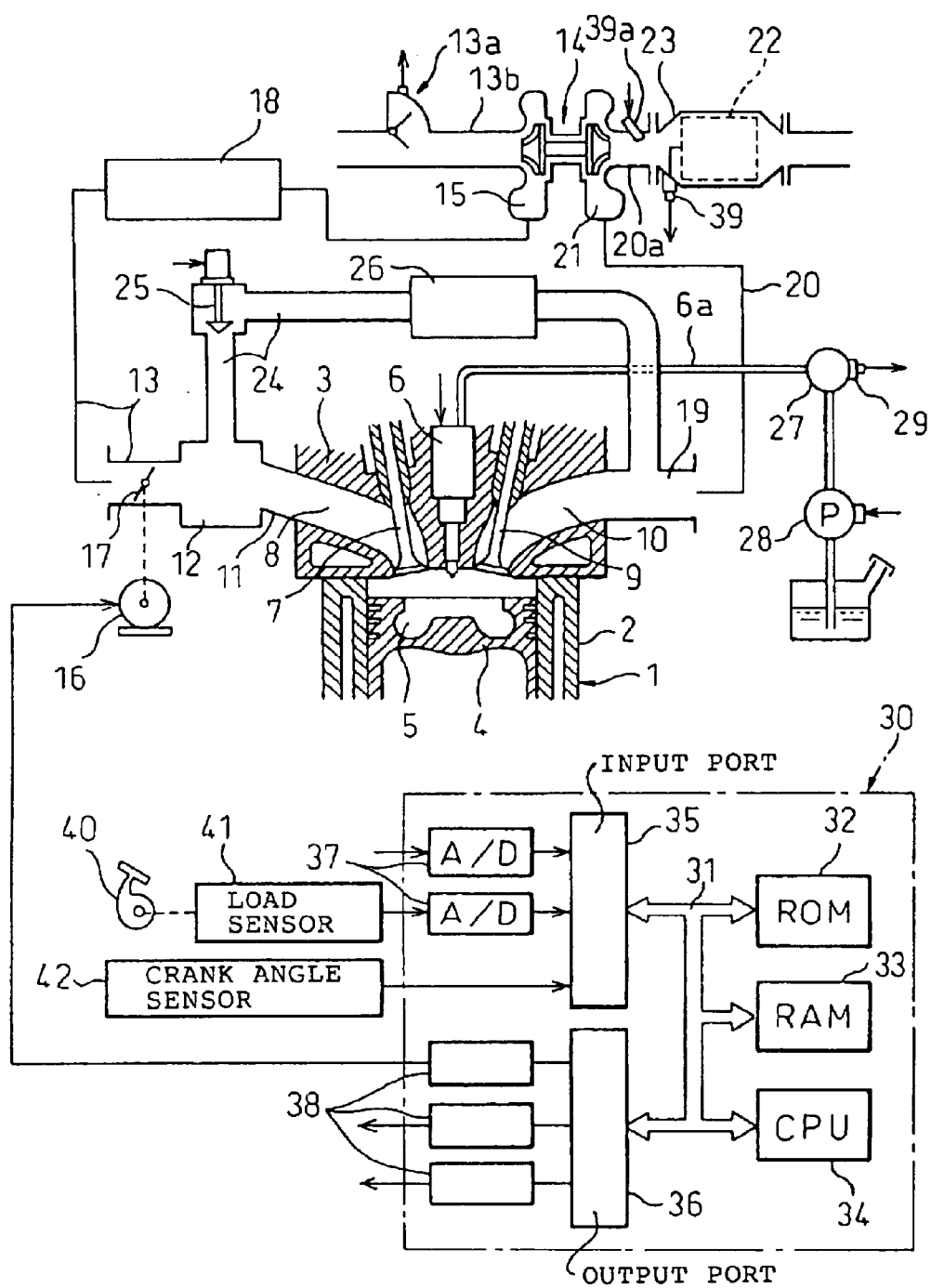
FIG. 1 is an overall view of an internal combustion engine.

Referring to embodiments shown in the drawings. The present invention will be explained below. FIG. 1 shows the case of application of the present invention to a compression ignition type internal combustion engine. Note that the present invention can also be applied to a spark ignition type internal combustion engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to a compressor 15 of an exhaust turbocharger 14 through an intake duct 13. An air flow meter 13a for detecting a mass flow rate of an intake air is arranged in an intake pipe 13b upstream of the compressor 15. Inside the intake duct 13 is arranged a throttle valve 17 driven by a stepping motor 16, and further, a cooling device 18 is arranged around the intake duct 13 for cooling the intake air flowing through the intake duct 13. In the embodiment shown in FIG. 1, an engine coolant water is led inside the cooling device 18 and the intake air is cooled by the engine coolant water. On the other hand, the exhaust port 10 is connected to an exhaust turbine 21 of the exhaust turbocharger 14 through an exhaust manifold 19 and an exhaust pipe 20, and the outlet of the exhaust turbine 21 is connected to a casing 23 housing a particulate filter 22.

The exhaust manifold 19 and the surge tank 12 are connected to each other through an exhaust gas recirculation (EGR) passage 24, and inside the EGR passage 24 is arranged an electrically controlled EGR control valve 25. A cooling device 26 is arranged around the EGR passage 24 to cool an EGR gas circulating inside the EGR passage 24. In the embodiment shown in FIG. 1, the engine coolant water is led inside the cooling device 26 and the EGR gas is cooled by the engine coolant water. On the other hand, each fuel injector 6 is connected to a fuel reservoir, a so-called common rail 27, through fuel feed pipe 6a fuel is fed into the common rail 27 from an electrically controlled variable discharge fuel pump 28, and the fuel fed into the common rail 27 is fed to the fuel injectors 6 through the fuel feed pipes 6a. The common rail 27 has a fuel pressure sensor 29 attached to it for detecting the fuel pressure in the common rail 27, and the discharge of the fuel pump 28 is controlled based on the output signal of the sensor 29 so that the fuel pressure in the common rail 27 becomes a target fuel pressure.

An electronic control unit 30 is comprised of a digital computer provided with a ROM (read only memory) 32, a RAM (random access memory) 33, a CPU (microprocessor) 34, an input port 35, and an output port 36 connected to each other through a bidirectional bus 31. The output signal of the fuel pressure sensor 29 is input through a corresponding AD converter 37 to the input port 35. Further, the particulate filter 22 has attached to it a temperature sensor 39 for detecting the particulate filter 22, and the output signal of this sensor 39 is input to the input port 35 through the corresponding AD converter 37. The output signal of the air flow meter 13a is input to the input port 35 through the corresponding AD converter 37. An accelerator pedal 40 has connected to it a load sensor 41 generating an output voltage proportional to the amount of depression L of the accelerator pedal 40, and the output voltage of this sensor 41 is input to the input port 35 through the corresponding AD converter 37. Further, the input port 35 has connected to it a crank angle sensor 42 generating an output pulse each time a crankshaft rotates by for example 30 degrees. On the other hand, the output port 36 is connected through corresponding drive circuits 38 to the fuel injectors 6, the stepping motor 16 for driving the throttle valve, the EGR control valve 25, and the fuel pump 28.

Figure 2A:
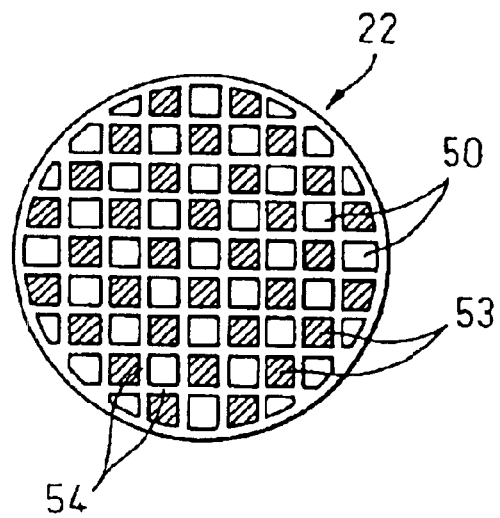
FIGS. 2A and 2B are views of a particulate filter.
Figure 2B:
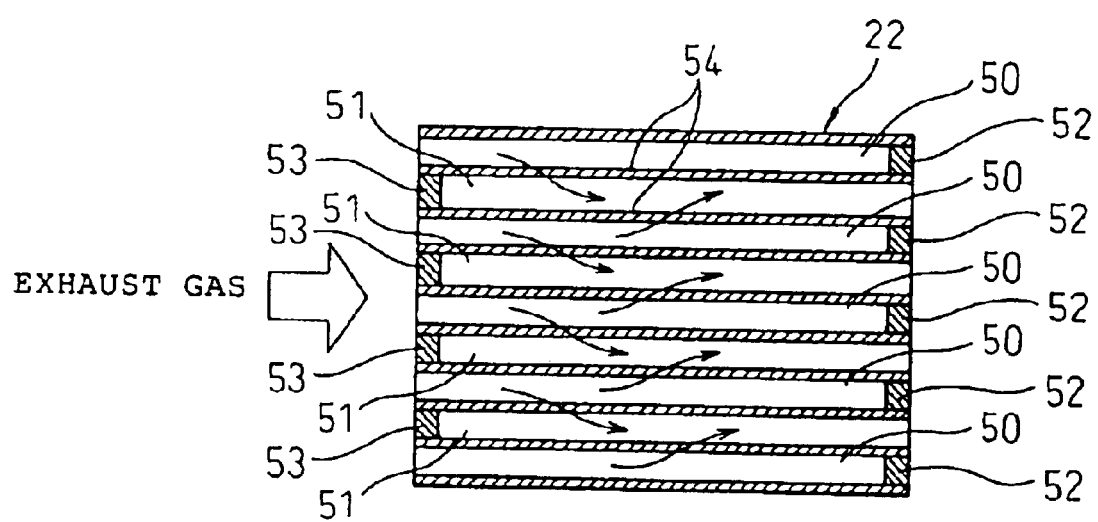

FIGS. 2A and 2B show a structure of the particulate filter 22. Note that FIG. 2A is a front view of the particulate filter 22, while FIG. 2B is a side sectional view of the particulate filter 22. As shown in FIGS. 2A and 2B, the particulate filter 22 forms a honeycomb structure and is provided with a plurality of exhaust circulation passages 50, 51 extending in parallel with each other. These exhaust circulation passages are comprised by exhaust gas inflow passages 50 with downstream ends sealed by plugs 52 and exhaust gas outflow passages 51 with upstream ends sealed by plugs 53.

Note that the hatched portions in FIG. 2A show the plugs 53. Therefore, the exhaust gas inflow passages 50 and the exhaust gas outflow passages 51 are arranged alternately through thin wall partitions 54. In other words, the exhaust gas inflow passages 50 and the exhaust gas outflow passages 51 are arranged so that each exhaust gas inflow passage 50 is surrounded by four exhaust gas outflow passages 51, and each exhaust gas outflow passage 51 is surrounded by four exhaust gas inflow passages 50.

The particulate filter 22 is formed from a porous material such as, for example, cordierite and, therefore, the exhaust gas flowing into the exhaust gas inflow passages 50 flows out into the adjoining exhaust gas outflow passages 51 through the surrounding partitions 54 as shown by the arrows in FIG. 2B.

In this embodiment of the present invention, a layer of a carrier comprised of, for example, alumina is formed on peripheral surfaces of the exhaust gas inflow passages 50 and the exhaust gas outflow passages 51, that is, entire opposite side surfaces of the partitions 54, entire outer end surfaces of the plugs 53, and entire inner end surfaces of the plugs 52, 53, and on the carrier are carried a precious metal catalyst and an active oxygen release agent which absorbs the oxygen and holds the oxygen if an excess oxygen is present in the surroundings and releases the held oxygen in the form of active oxygen if a concentration of the oxygen in the surroundings falls.

Further, in this embodiment of the present invention, a layer of a carrier comprised of, for example, alumina is formed on the entire wall surfaces of fine holes in each partition 54, and on the carrier are carried a precious metal catalyst and the above explained active oxygen release agent.

In this case, in this embodiment according to the present invention, platinum Pt is used as the precious metal catalyst and, as the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cerium Ce, a transition metal such as iron, Fe, and a carbon family element such as tin Sn.

Note that, as the active oxygen release agent, use is preferably made of an alkali metal or an alkali earth metal with a higher tendency of ionization than calcium Ca, that is, potassium K, lithium Li, cesium Cs, rubidium Rb, barium Ba, and strontium Sr.

Next, an action of removal of the particulates in the exhaust gas by the particulate filter 22 will be explained taking as an example the case of carrying platinum Pt and potassium K on a carrier, but the same type of action of removal of the particulates is performed even when using another precious metal, alkali metal, alkali earth metal, rare earth, transition metal and carbon family element.

In a compression ignition type internal combustion engine such as shown in FIG. 1, combustion occurs even under an excess of air, and therefore, the exhaust gas contains a large amount of excess air. That is, if the ratio of the air and fuel fed into the intake passage, and combustion chamber 5, is called the air-fuel ratio of the exhaust gas, then in a compression ignition type internal combustion engine such as shown in FIG. 1, the air-fuel ratio of the exhaust gas is lean. Further, in the combustion chamber 5, NO is generated, so the exhaust gas contains NO. Further, the fuel contains sulfur S, and this sulfur S reacts with the oxygen in the combustion chamber 5 to become $SO_2$. Therefore, the exhaust gas contains $SO_2$. Accordingly, the exhaust gas containing excess oxygen, NO, and $SO_2$ flows into the exhaust gas inflow passages 50 of the particulate filter 22.

Figure 3A:
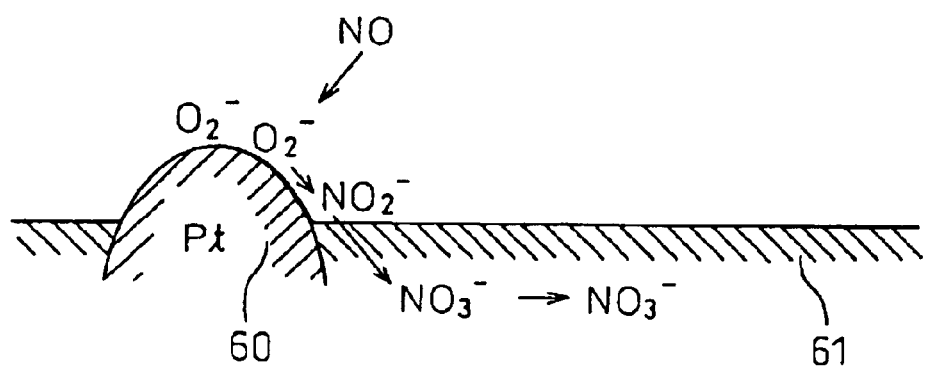
FIGS. 3A and 3B are views for explaining an oxidation action of particulates.
Figure 3B:
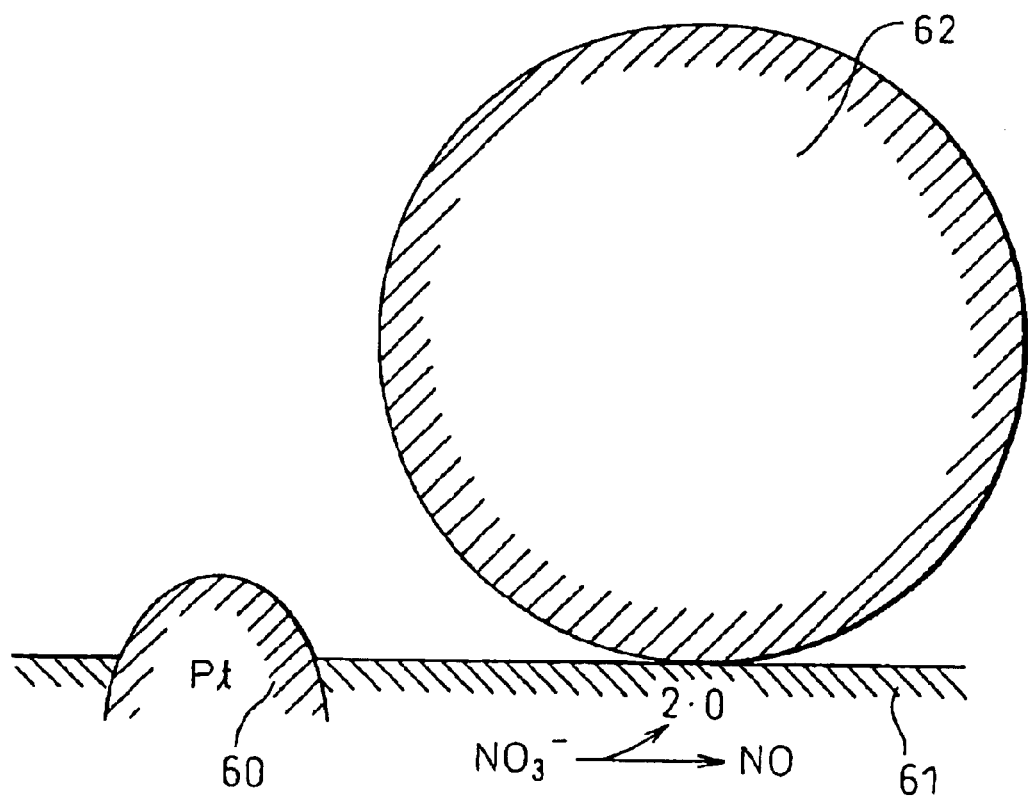

FIGS. 3A and 3B are enlarged views of the surface of the carrier layer formed on the inner circumferential surfaces of the exhaust gas inflow passages 50. Note that in FIGS. 3A and 3B, 60 indicates particles of platinum Pt, while 61 indicates the active oxygen release agent containing potassium K.

As explained above, since a large amount of excess oxygen is contained in the exhaust gas, if the exhaust gas flows into the exhaust gas inflow passages 50 of the particulate filter 22, as shown in FIG. 3A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the produced $NO_2$ is absorbed in the active oxygen release agent 61 while being oxidized on the platinum Pt and diffuses in the active oxygen release agent 61 in the form of nitrate ions $NO_3^-$ as shown in FIG. 3A while bonding with the potassium K to produce potassium nitrate $KNO_3$.

On the other hand, as explained above, the exhaust gas also contains $SO_2$, and this $SO_2$ is absorbed in the active oxygen release agent 61 by a mechanism similar to that of NO. That is, in the above way, the oxygen $O_2$ adheres to the surface of the platinum Pt in the form of $O_2^-$ or $O^{2-}$, and the $SO_2$ in the exhaust gas reacts with the $O_2^-$ or $O^{2-}$ on the surface of the platinum Pt to become $SO_3$. Next, part of the produced $SO_3$ is absorbed in the active oxygen release agent 61 while being oxidized on the platinum Pt and diffuses in the active oxygen release agent 61 in the form of sulfate ions $SO_4^{2-}$ while bonding with the potassium K to produce potassium sulfate $K_2SO_4$. In this way, potassium sulfate $KNO_3$ and potassium sulfate $K_2SO_4$ are produced in the active oxygen release agent 61.

On the other hand, particulates comprised mainly of carbon are produced in the combustion chamber 5, and therefore, the exhaust gas contains the particulates. The particulates contained in the exhaust gas contact and adhere to the surface of the carrier layer, for example, the surface of the active oxygen release agent 61, as shown by 62 in FIG. 3B when the exhaust gas is flowing through the exhaust gas inflow passages 50 of the particulate filter 22 or when heading from the exhaust gas inflow passages 50 to the exhaust gas outflow passages 51.

If the particulates 62 adhere to the surface of the active oxygen release agent 61 in this way, a concentration of oxygen at the contact surface of the particulate 62 and the active oxygen release agent 61 falls. If the concentration of oxygen falls, a difference in concentration occurs with the inside of the high oxygen concentration active oxygen release agent 61 and therefore the oxygen in the active oxygen release agent 61 moves toward the contact surface between the particulates 62 and the active oxygen release agent 61. As a result, the potassium nitrate $KNO_3$ formed in the active oxygen release agent 61 is broken down into potassium K, oxygen O, and NO, and then the oxygen O moves toward the contact surface between the particulate 62 and the active oxygen release agent 61, while the NO is released from the active oxygen release agent 61 to the outside. The NO released to the outside is oxidized on the downstream side platinum Pt and is again absorbed in the active oxygen release agent 61.

On the other hand, the potassium sulfate $K_2SO_4$ formed in the active oxygen release agent 61 is also broken down into potassium K, oxygen O, and $SO_2$, and then the oxygen O moves toward the contact surface between the particulates 62 and the active oxygen release agent 61, while the $SO_2$ is released from the active oxygen release agent 61 to the outside. The $SO_2$ released to the outside is oxidized on the downstream side platinum Pt and is again absorbed in the active oxygen release agent 61. Note that, since the potassium sulfate $K_2SO_4$ is stable, the potassium sulfate $K_2SO_4$ releases less active oxygen than the potassium nitrate $KNO_3$.

Further, as explained above, the active oxygen release agent 61 produces and releases the active oxygen at the process of the reaction of $NO_x$ with the oxygen when the active oxygen release agent 61 absorbs $NO_x$ in the form of the nitrate ions $NO_3^-$. Similarly, as explained above, the active oxygen release agent 61 produces and releases the active oxygen at the process of the reaction of $SO_2$ with the oxygen when the active oxygen release agent 61 absorbs $SO_2$ in the form of the sulfate ions $SO_4^{2-}$.

On the other hand, the oxygen O moving toward the contact surface between the particulates 62 and the active oxygen release agent 61 is the oxygen broken down from compounds such as potassium nitrate $KNO_3$ or potassium sulfate $K_2SO_4$. The oxygen O broken down from these compounds has a high energy and has an extremely high activity. Therefore, the oxygen moving toward the contact surface between the particulate 62 and the active oxygen release agent 61 is an active oxygen O.

Similarly, the oxygen produced at the process of the reaction of $NO_x$ with the oxygen or the reaction of $SO_2$ with the oxygen in the active oxygen release agent 61 is also an active oxygen.

If this active oxygen O contacts the particulates 62, the particulates 62 are oxidized without emitting a luminous flame for a short period (several seconds to several tens of minutes) and thus are completely removed. Thus, almost no particulates 62 deposits on the particulate filter 22. Therefore, the active oxygen release agent 61 is an oxidazing material for oxidizing the particulates.

When the particulates deposited in layers on the particulate filter 22 are burn according to the prior art, the particulate filter 22 becomes red hot and burns along with a flame. This burning along with a flame does not continue unless the temperature is high, and therefore, to continue such a burning along with such a flame, the temperature of the particulate filter 22 must be maintained at a high temperature.

As opposed to this, in the present invention, the particulates 62 are oxidized without emitting a luminous flame as explained above, and at this time, the surface of the particulate filter 22 does not become red hot. That is, in other words, in the present invention, the particulates 62 are removed by oxidation by a temperature considerably lower than that in the prior art. Accordingly, the action of removal of the particulates 62 by oxidation without emitting a luminous flame according to the present invention is completely different from the conventional action of removal of particulates by burning accompanied with a flame.

The platinum Pt and the active oxygen release agent 61 become more active, the higher the temperature of the particulate filter 22, so the amount of the particulates removable by oxidation per unit time without emitting a luminous flame on the particulate filter 22 increases, the higher the temperature of the particulate filter 22.

Figure 5:
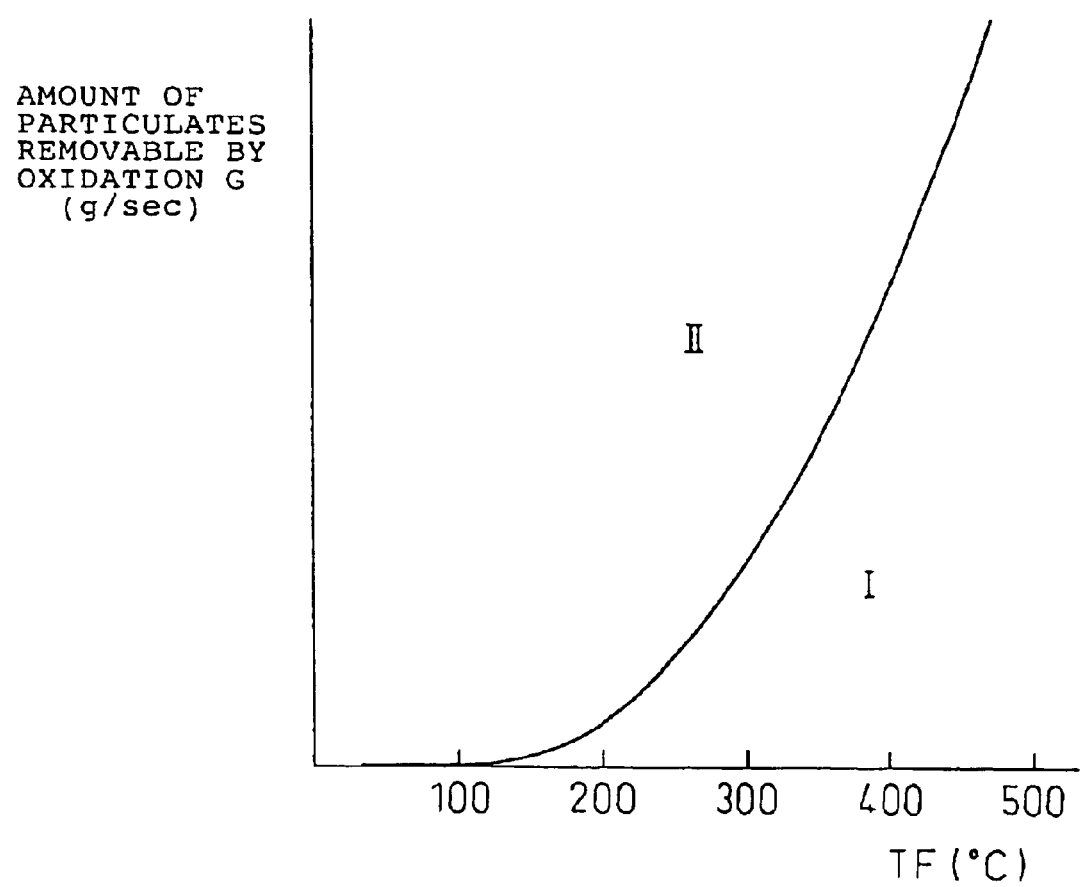
FIG. 5 is a view showing a relationship between an amount of the particulates removable by oxidation and a temperature of the particulate filter.

A solid line in FIG. 5 shows an amount G of the particulates removable by oxidation per unit time without emitting a luminous flame. An abscissa of FIG. 5 shows a temperature TF of the particulate filter 22. Now, if an amount of the particulates discharged from the combustion chamber 5 per unit time is called an amount M of discharged particulates, when the amount M of discharged particulates is smaller than the amount G of particulates removable by oxidation for the same unit time, that is, in the region I of FIG. 5, all of the particulates discharged from the combustion chamber 5 are removed by oxidation successively in a short time (several seconds to several tens of minutes) without emitting a luminous flame on the particulate filter 22 by the contact of the particulates to the particulate filter 22.

Figure 4A:
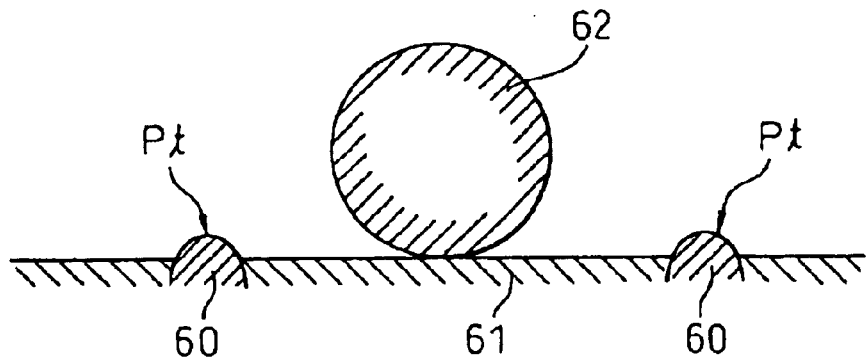
FIGS. 4A–4C are views for explaining an action of deposition of particulates.
Figure 4B:
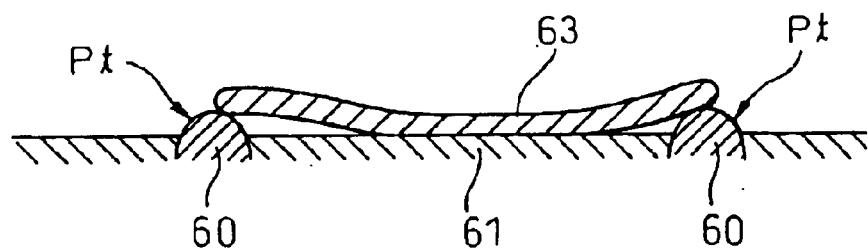
Figure 4C:
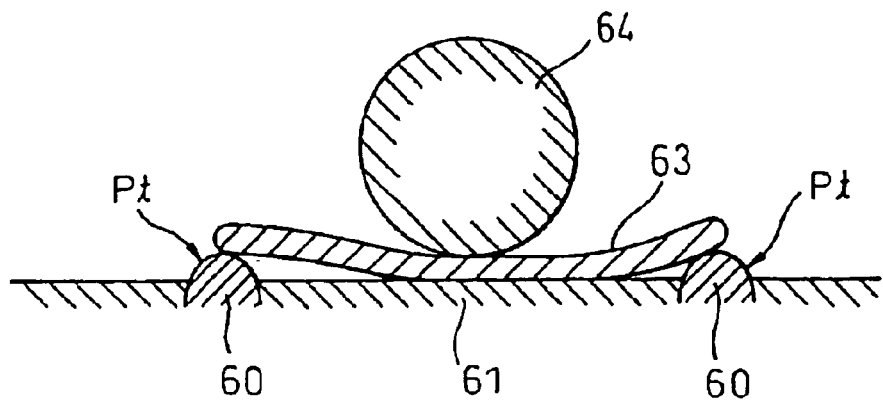

As opposed to this, when the amount M of the discharged particulates is larger than the amount G of the particulates removable by oxidation, that is, in the region II of FIG. 5, the amount of the active oxygen is not sufficient for oxidation of the all of the particulates. FIGS. 4A to 4C show the state of oxidation of particulates in this case.

That is, when the amount of active oxygen is not sufficient for oxidation of all of the particulates, if particulates 62 adhere on the active oxygen release agent 61 as shown in FIG. 4A, only part of the particulates 62 are oxidized, and then a portion of the particulates not sufficiently oxidized remains on the carrier layer. Next, if the state of insufficient amount of active oxygen continues, the portions of the particulates not oxidized successively are left on the carrier layer, and as a result, as shown in FIG. 4B, the surface of the carrier layer is covered by the residual particulate portion 63.

This residual particulate portion 63 covering the surface of the carrier layer gradually changes to hard-to-oxidize graphite, and therefore, the residual particulate portion 63 easily remains as it is. Further, if the surface of the carrier layer is covered by the residual particulate portion 63, the action of oxidation of the NO and $SO_2$ by the platinum Pt and the action of release of the active oxygen from the active oxygen release agent 61 are suppressed. As a result, as shown in FIG. 4C, other particulates 64 successively deposit on the residual particulate portion 63. That is, the particulates deposit in layers. If the particulates deposit in layers in this way, the particulates are separated in distance from the platinum Pt or the active oxygen release agent 61, so even if they are easily oxidizable particulates, they will not be oxidized by active oxygen O, and therefore, other particulates successively deposit on the particulates 64. That is, if the state of the amount M of discharged particulates being larger than the amount G of particulates removable by oxidation continues, particulates deposit in layers on the particulate filter 22 and, therefore, unless the temperature of the exhaust gas is made higher or the temperature of the particulate filter 22 is made higher, it is no longer possible to cause the depositing particulates to ignite and burn.

In this way, in the region I of FIG. 5, the particulates are burned in a short time without emitting a luminous flame on the particulate filter 22. On the other hand, in the region II of FIG. 5, the particulates deposit in layers on the particulate filter 22. Therefore, to prevent the particulates from depositing in layers on the particulate filter 22, the amount M of discharged particulates has to be kept smaller than the amount G of particulates removable by oxidation at all times.

As will be understood from FIG. 5, with the particulate filter 22 used in this embodiment of the present invention, the particulates can be oxidized even if the temperature TF of the particulate filter 22 is considerably low, and therefore, in a compression ignition type internal combustion engine shown in FIG. 1, it is possible to maintain the amount M of discharged particulates and the temperature TF of the particulate filter 22 so that the amount M of discharged particulates usually becomes smaller than the amount G of particulates removable by oxidation.

Therefore, in the first embodiment of the present invention, the amount M of discharged particulates and the temperature TF of the particulate filter 22 are maintained so that the amount M of discharged particulates usually becomes smaller than the amount G of particulates removable by oxidation. If the amount M of discharged particulates is maintained to be usually smaller than the amount G of particulates removable by oxidation, the particulates hardly deposit in layers on the particulate filter 22 and, as a result, the pressure loss of the flow of the exhaust gas in the particulate filter 22 hardly increases. Therefore, the output of the engine hardly decreases.

On the other hand, as explained above, if the particulates deposit in layers on the particulate filter 22, it is hard to oxidize the particulates by active oxygen even when the amount M of discharged particulates becomes smaller than the amount G of particulates removable by oxidation. However, when the portions of the particulates which are not oxidized begin to remain, that is, the amount of depositing particulates is smaller than a certain level, the remaining particulates may be removed by oxidation with the active oxygen O without emitting a luminous flame if the amount M of discharged particulates becomes smaller than the amount G of particulates removable by oxidation.

According to the second embodiment of the present invention, the amount M of discharged particulates and the temperature TF of the particulate filter are maintained such that the amount M of discharged particulates normally is smaller than the amount G of particulates removable by oxidation, and such that the surface of the carrier layer is not covered by the remaining particulate portions 63 as opposed to the case shown in FIG. 4B even when the amount M of discharged particulates temporarily becomes larger than the amount G of particulates removable by oxidation, that is, such that the amount of particulates depositing of the particulate filter 22 in layers is maintained smaller than a certain level so as to remove the particulates by oxidation when the amount M of discharged particulates becomes smaller than the amount G of particulates removable by oxidation.

In particular, just after the engine operation starts, the temperature TF of the particulate filter 22 is low, and thus, the amount M of discharged particulates is larger than the amount G of particulates removable by oxidation. Therefore, in consideration of the actual operation of the engine, it is deemed that the second embodiment is practical.

On the other hand, even if the amount M of discharged particulates and the temperature TF of the particulate filter 22 are controlled to practice the first or second embodiment, particulates may deposit on the particulate filter 22 in layers. In this case, the particulates depositing on the particulate filter 22 may be oxidized without emitting a luminous flame by temporarily making the air-fuel ratio of a part or an entire of the exhaust gas rich.

That is, if the air-fuel ratio of the exhaust gas has continued to be lean over a certain time period, a large amount of oxygen adheres to platinum Pt, and thus, the catalytic ability of the platinum Pt decreases. However, if the air-fuel ratio of the exhaust gas is made rich to decrease the concentration of oxygen in the exhaust gas, the oxygen is removed from the platinum Pt, and thus, the catalytic ability of the platinum Pt is recovered. Therefore, when the air-fuel ratio of the exhaust gas is made rich, the rapid releasing of active oxygen O from the active oxygen release agent 61 to the outside is promoted. Thus, the nature of the depositing particulates is changed to an extent that the particulates are easily oxidized by the rapidly released active oxygen O, and the particulates are removed by oxidation with the active oxygen without emitting a luminous flame. Therefore, when the air-fuel ratio of the exhaust gas is made rich, the amount G of particulates removable by oxidation totally increases. Note that, in this case, the air-fuel ratio of the exhaust gas is made rich when particulates deposit in layer on the particulate filter 22 or periodically independently of the particulates depositing in layers.

For example, a method comprising steps of controlling opening degrees of the throttle valve 17 and the EGR control valve 25 such that the EGR rate (the amount of EGR gas/(the amount of intake air+the amount of EGR gas)) is equal to or larger than 65 percent and controlling the amount of injected fuel such that an average air-fuel ratio in the combustion chamber 5 is rich when the engine load is relatively low may be employed as a method for making the air-fuel ratio of the exhaust gas rich.

Figure 6:
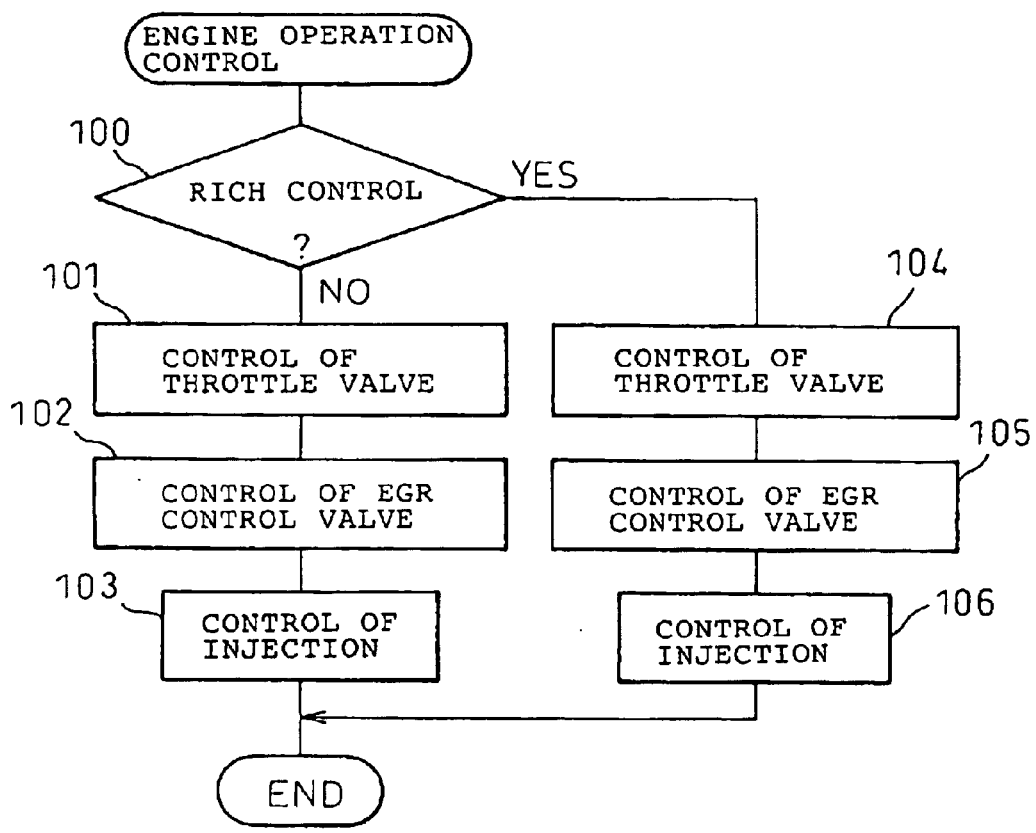
FIG. 6 is a flowchart for controlling an engine operation.

FIG. 6 shows an example of the routine for controlling the above-explained engine operation.

Referring to FIG. 6, initially at step 100, it is judged if an average air-fuel ratio in the combustion chamber 5 should be made rich. When it is judged that it is not necessary to make the average air-fuel ratio in the combustion chamber 5 rich, the routine proceeds to step 101 where an opening degree of the throttle valve 17 is controlled, and then, at step 102, an opening degree of the EGR control valve 25 is controlled, and then, at step 103, the amount of injected fuel is controlled such that the amount M of discharged particulates is maintained smaller than the amount G of particulates removable by oxidation.

On the other hand, at step 100, when it is judged that the average air-fuel ratio in the combustion chamber 5 should be made rich, the routine proceeds to step 104 where the opening degree of the throttle valve 17 is controlled, and then, at step 105, the opening degree of the EGR control valve 25 is controlled such that the EGR rate is maintained equal to or larger than 65 percent, and then, at step 106, the amount of injected fuel is controlled such that the average air-fuel ratio in the combustion chamber 5 is maintained rich.

As explained above, the partitions 54 for dividing the exhaust circulation passages 50, 51 of the particulate filter 22 are formed from the porous material, and the platinum Pt and the active oxygen release agent 61 are carried on the wall surfaces defining the fine holes of the partitions 54. The exhaust gas flows through the fine holes of the partitions 54, and then, the particulates are removed by oxidation while the exhaust gas flows through the fine holes from the exhaust gas inflow passages 50 to the exhaust gas outflow passages 51. However, the particulates may deposit in the fine holes, thereby clogging the fine holes. Further, if the amount of depositing particulates becomes large, the fine holes will be blocked. In this case, thereafter, the particulates are not removed by oxidation. According to the present invention, the particulates depositing in the fine holes of the partitions 54 are removed by oxidation by forcibly fluidizing the particulates in an interior of the partitions by one of several methods explained later.

When the particulates which are not removed by oxidation and adhere to the wall surfaces defining the fine holes of the partitions 54 or to the particulates remaining on the wall surfaces defining the fine holes are fluidized in the fine holes of the partitions 54, the opportunities for the particulates to contact the active oxygen release agent carried on the other wall surfaces defining the fine holes are increased, and thus, the ability of removal by oxidation becomes extremely large. Further, when the particulates are fluidized in the fine holes of the partitions, and thus, the particulates are removed by oxidation, using the other wall surfaces defining the fine holes, the wall surfaces defining the fine holes of the partitions are uniformly used, and thus, the amount of particulates removable by oxidation by the particulate filter is maintained large.

Next, concrete methods for fluidizing particulates in the fine holes of the partitions will be explained. The present invention has generally three concrete methods for fluidizing the particulates. That is, the present invention has a method comprising steps of pulsing the exhaust gas and introducing the pulsed exhaust gas into the fine holes of the partitions, a method comprising a step of reversing an inflow direction of the exhaust gas flowing into the fine holes of the partitions, and a method comprising a step of physically vibrating the particulate filter itself. Below, these methods will be explained in due course.

According to the first method comprising a step of pulsing the exhaust gas, the particulates depositing in the fine holes of the partitions 54 are vibrated by the pulsed exhaust gas. By the vibration, the particulates are forced to be desorbed from the wall surfaces defining the fine holes of the partitions 54 and, then, move in the fine holes. Note that the exhaust gas is pulsed by creating parts having different pressures in the exhaust gas. According to the present invention, as shown in FIG. 1, an exhaust gas pulsation device 39a is arranged in the exhaust passage 20a between the exhaust turbine 21 and the catalytic converter 23, and a gas having pressure higher than that of the exhaust gas is introduced from the device 39a into the exhaust gas at extremely short time intervals. Thereby, the exhaust gas is pulsed.

Alternatively, the exhaust gas may be pulsed by employing a method comprising a step of drawing the exhaust gas by the exhaust gas pulsation device 39a at extremely short time intervals, as another method. Further, alternatively, the exhaust gas may be pulsed by employing a method comprising steps of drawing the exhaust gas into the exhaust gas pulsation device 39a and discharging the drawn exhaust gas from the device 39a, that is, repeating the drawing and discharging of the exhaust gas at extremely short time intervals, as another method.

Figure 7:
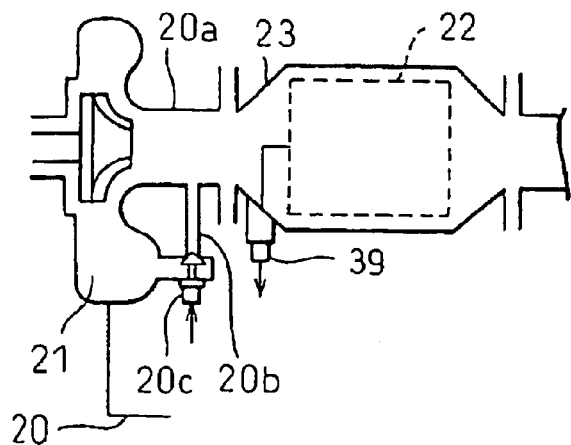
FIG. 7 is a view for explaining an exhaust gas pulsation method.

Further, alternatively, as shown in FIG. 7, in case that the engine is constructed such that the exhaust passage 20 upstream of the exhaust turbine 21 is connected to the exhaust passage 20 downstream of the exhaust turbine 21 by a bypass passage 20b, and that a bypass control valve 20c is arranged in the bypass passage 20b, and that the exhaust gas bypasses the exhaust turbine 21 through the bypass passage 20b when the bypass control valve 20c opens, the exhaust gas may be pulsed by employing a method comprising a step of repeating opening and closing of the bypass control valve 20c, as another method. In this case, noted that the bypass control valve 20c is connected to the output port 36 via a corresponding drive circuit 38.

Further, alternatively, in case that the engine has a plurality of the combustion chambers 5, the exhaust gas may be pulsed by employing a method comprising a step of injecting the fuel into only certain combustion chambers 5 from the fuel injectors 6, thereby making the pressures of the exhaust gas discharged from the combustion chambers 5 different from each other.

Figure 8A:
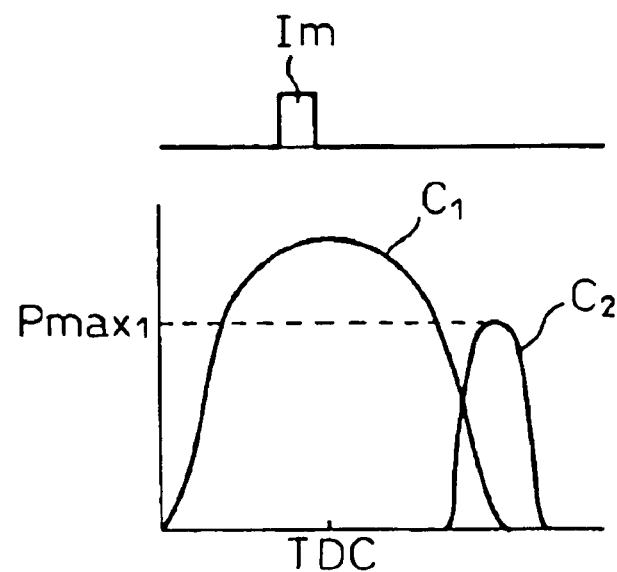
FIGS. 8A and 8B are views for explaining another exhaust gas pulsation method.
Figure 8B:
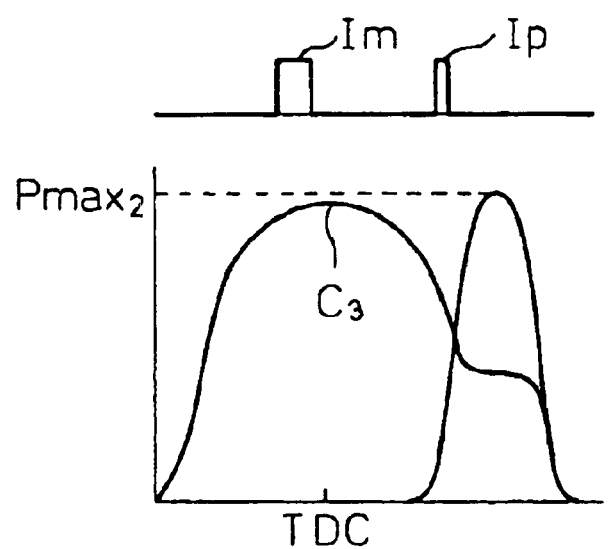

Further, alternatively, the exhaust gas may be largely pulsed by employing a method comprising a step of injecting fuel into the combustion chamber 5 from the fuel injector 6 during the latter half of the power stroke or the exhaust stroke after fuel for driving the engine is injected into the combustion chamber 5 from the fuel injector 6, as another method. According to this method, the fuel injected into the combustion chamber 5 during the latter half of the power stroke or the exhaust stroke burns, but the output therefrom is not used for driving the engine, thereby the pressure of the exhaust gas discharged from the combustion chamber 5 to the exhaust port becomes larger than that of the exhaust gas discharged when the engine is normally operated, and thus, the exhaust gas is largely pulsed. FIGS. 8A and 8B show this phenomena.

As shown by reference Im in FIG. 8A, a fuel injection for driving the engine (hereinafter, referred to as main fuel injection) is performed at the latter half of the power stroke when the engine is normally operated. In this case, the pressure in the combustion chamber 5 (hereinafter, referred to as cylinder pressure) changes as shown by a curve $C_1$. That is, the cylinder pressure gradually increases as the time goes toward the top dead center of the compression stroke TDC, and after the top dead center of the compression stroke TDC, gradually decreases. The exhaust valve 9 opens while the cylinder pressure gradually decreases, and thus, the pressure of the exhaust gas discharged to the exhaust port 10 (hereinafter, referred to as exhaust pressure) changes as shown by a curve $C_2$. In this case, the exhaust gas having the maximum pressure $P_{max1}$ is discharged to the exhaust port 10.

On the other hand, as shown by reference Ip in FIG. 8B, when the engine operation is in a state that the exhaust gas should be largely pulsed, a fuel injection (hereinafter, referred to as sub fuel injection) is performed at the latter half of the power stroke or the exhaust stroke after the main fuel injection Im is performed. In this case, the cylinder pressure changes as shown in a curve $C_3$. That is, the cylinder pressure gradually increases as the time goes toward the top dead center of the compression stroke TDC and, after the top dead center of the compression stroke TDC, gradually decreases, but in the time when the engine is normally operated, the cylinder pressure is temporarily maintained constant just after the sub fuel injection is performed, and thereafter, gradually decreases. Then, the exhaust valve 9 opens while the cylinder pressure is maintained constant. Therefore, the exhaust gas, having a maximum pressure $P_{max2}$ larger than the maximum pressure $P_{max1}$ when the engine is normally operated, is discharged to the exhaust port 10. Thereby, the exhaust gas is largely pulsed.

Alternatively, in case that the engine comprises a plurality of the combustion chambers 5, the above-explained sub fuel injection may be performed in all combustion chamber 5, or only certain combustion chambers 5. Which manner of the sub fuel injection is employed is determined depending on, for example, a desired manner of the exhaust gas pulsation, or the amount of fuel injected by the sub fuel injection to cause the exhaust gas to pulse with a desired degree of the pulsation, or the possibility of the fuel injected by the sub fuel injection adhering to the inner wall surface defining the combustion chamber 5, or the amount of depositing particulates.

Further, in case that the sub fuel injection is performed at the latter half of the exhaust stroke, the fuel injected by the sub fuel injection does not burn in the combustion chamber 5, and thus, may be discharged to the exhaust port 10. However, in this case, the purpose to pulse the exhaust gas is sufficiently accomplished by means of burning the unburned fuel discharged to the exhaust port 10 before the unburned fuel flows into the particulate filter 22.

Figure 9A:
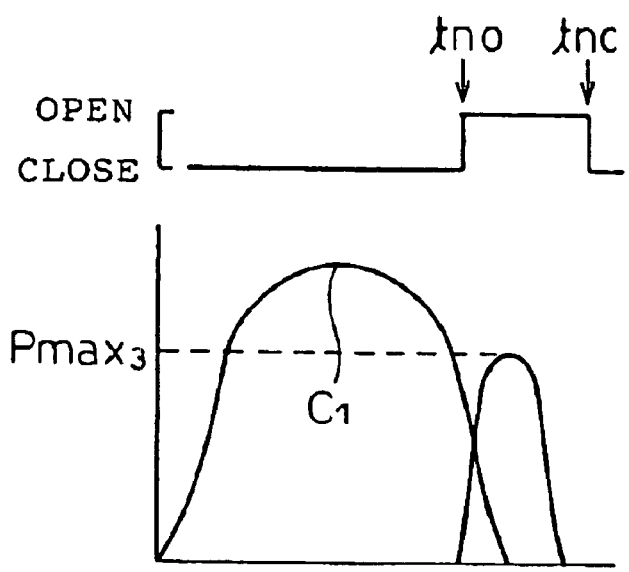
FIGS. 9A and 9B are views for explaining further another exhaust gas pulsation method.
Figure 9B:
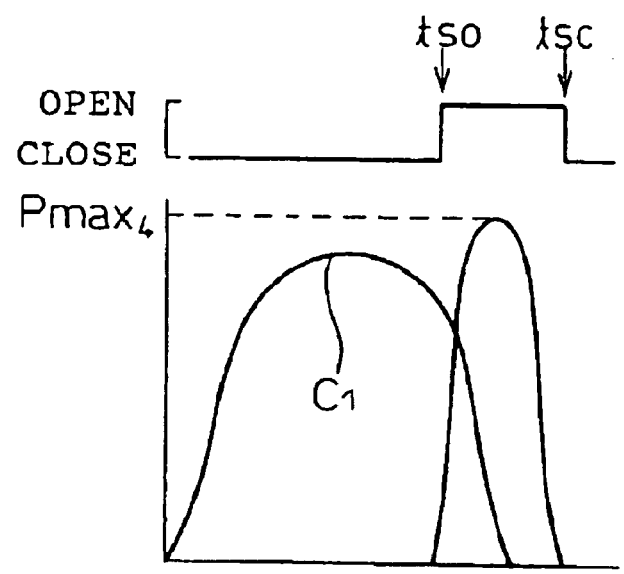

Further, alternatively, the exhaust gas may be largely pulsed by employing a method comprising a step of advancing a time to open the exhaust valve 9 in comparison to a normal time to open the exhaust valve, as another method. According to this method, after the top dead center of the compression stroke, the earlier the time, the larger the cylinder pressure, and thus, the earlier the exhaust valve 9 opens, the larger the pressure of the exhaust gas discharged to the exhaust port 10, thereby the exhaust gas is largely pulsed. FIGS. 9A and 9B shows this phenomena.

As shown in FIG. 9A, when the engine is normally operated, the exhaust valve 9 opens at a time $t_{no}$, and closes at a time $t_{nc}$. When the exhaust valve 9 opens and closes in this way, the exhaust gas having a maximum pressure $P_{max3}$ is discharged to the exhaust port 10. On the other hand, as shown in FIG. 9B, when the engine operation is in the state that the exhaust gas should be largely pulsed, the exhaust valve 9 opens at a time $t_{so}$ earlier than the time $t_{no}$, and closes at a time $t_{sc}$ earlier than the time $t_{nc}$. When the exhaust valve 9 opens in this way, the exhaust gas having a maximum pressure $P_{max4}$ larger than the maximum pressure $P_{max3}$ is discharged to the exhaust port 10. Thereby, the exhaust gas is largely pulsed.

In case that the engine has a plurality of the combustion chambers 5, the time to open the exhaust valve 9 is advanced at all combustion chambers 5, or at only certain combustion chambers 5. Which manner is employed is determined, depending on, for example, a desired manner of the exhaust gas pulsation, or the amount of depositing particulates.

Figure 10:
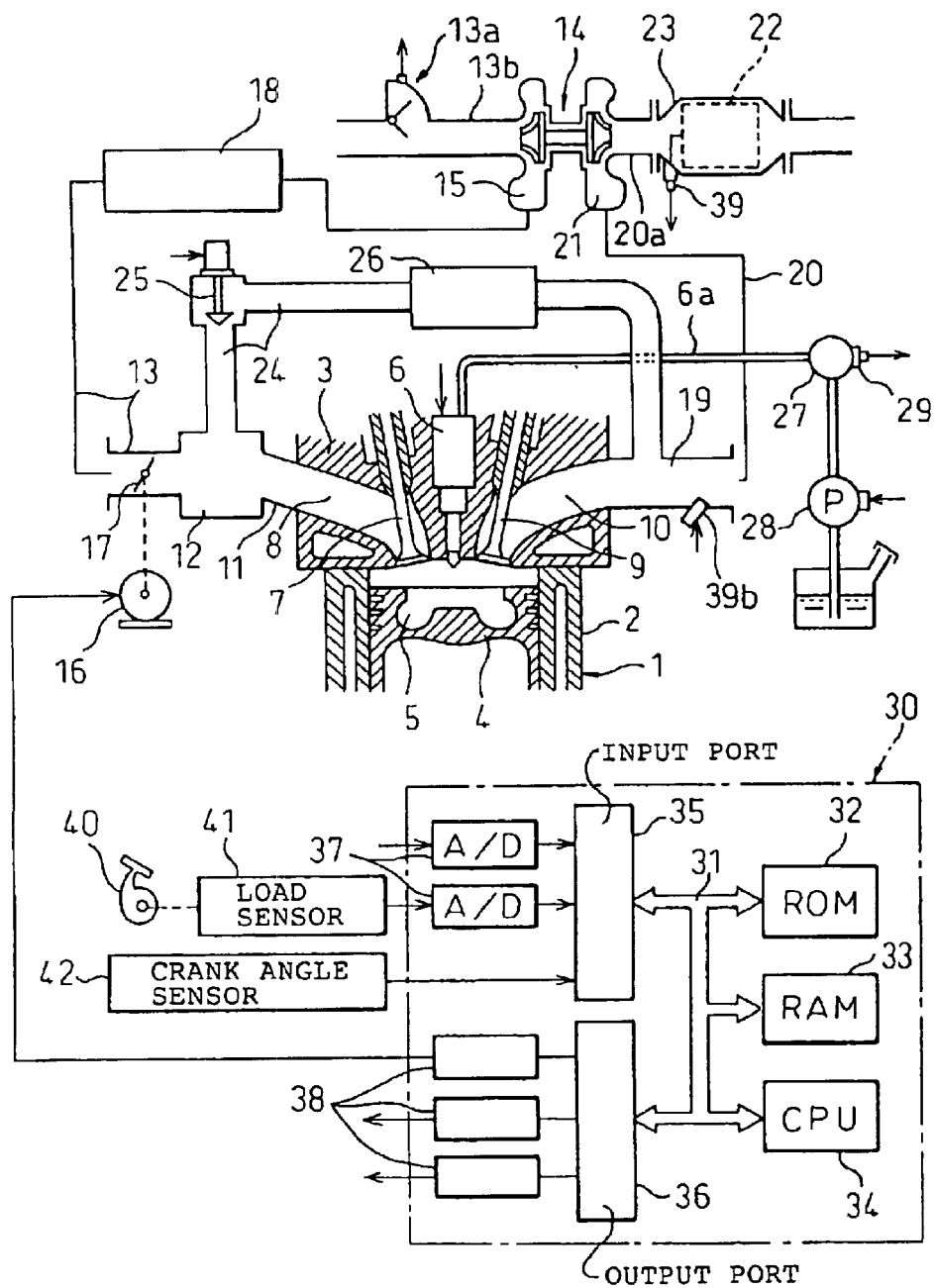
FIG. 10 is an overall view of the engine designed to perform further another exhaust gas pulsation method.

Further, alternatively, the exhaust gas may be largely pulsed by employing a method comprising steps of mounting an air injector 39b for injecting an air into the upstream of the exhaust turbine 21 as shown in FIG. 10, and introducing the air from the injector 39b into the exhaust gas. According to this, the unburned but burnable fuel included in the exhaust gas is burned with the air injected from the injector 39b with the influence of the exhaust gas having the high temperature, and thus, the pressure of the exhaust gas increases. Noted that the injector 39b is connected to the output port 36 via a corresponding drive circuit 38.

Further, this method is advantageous over the above-explained method comprising a step of performing the sub fuel injection or advancing the time to open the exhaust valve since an interval to increase the pressure of the exhaust gas may be freely determined. Further, in case that the amount of unburned fuel included in the exhaust gas is relatively small, the sub fuel injection may be performed at the latter half of the power stroke or the exhaust stroke.

Further, in case that this method is performed when the engine operation is decelerated, the following control is performed. That is, when the exhaust gas should be largely pulsed while the engine operation is decelerated, a fuel is injected at a time when the engine is not driven, and an air is injected from the air injector 39b. According to this, the fuel injected at the time when the engine is not driven is discharged from the combustion chamber 5, and reacts with the air injected from the injector 39b, thereby increasing the pressure of the exhaust gas. According to this, the exhaust gas is largely pulsed.

To force the exhaust gas to largely pulse at the deceleration of the engine operation is effective for fluidizing the particulates in the particulate filter 22. This is because no fuel is injected for driving the engine at the deceleration of the engine operation, and thus, the pressure of the exhaust gas is essentially low, and further, if parts having a high pressure are forced to be created in the exhaust gas, the degree of the pressure variation of the exhaust gas flowing into the particulate filter 22 becomes extremely large.

Figure 11:
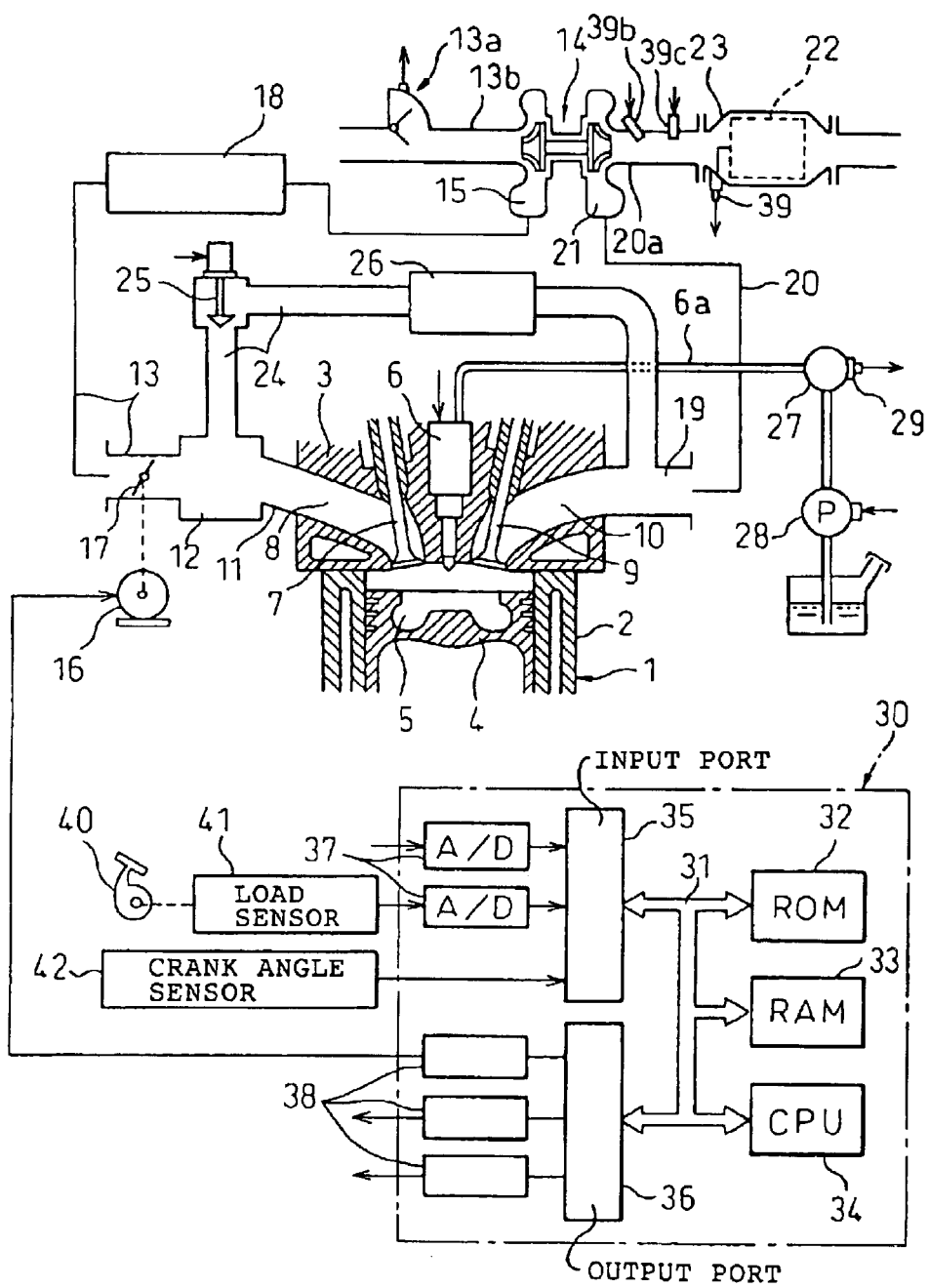
FIG. 11 is an overall view of the engine designed to perform further another exhaust gas pulsation method.

Further, alternatively, a method comprising steps of mounting an air injector 39b between the exhaust turbine 21 and the particulate filter 22 as shown in FIG. 11, mounting an ignition plug 39c downstream of the injector 39b and upstream of the particulate filter 22, introducing an air from the injector 39*b* into the exhaust gas, and activating the plug 39*c* to react unburned fuel included in the exhaust gas with the air injected from the injector 39*b* may be employed as another method. According to this, the unburned fuel included in the exhaust gas burns by reacting on the air injected from the injector 39*b*, and thereby, the pressure of the part of the exhaust gas is increased, and thus, the exhaust gas is pulsed. Noted that the injector 39*b* and the plug 39*c* are connected to the output port 36 via corresponding drive circuits 38.

Further, this method is advantageous over the above-explained method comprising a step of introducing an air into the exhaust gas upstream of the exhaust turbine 21 since the pressure of the exhaust gas is increased near the particulate filter 22, and thereby, the exhaust gas is much largely pulsed. Further, by using this method, the exhaust gas may be largely pulsed without injecting a fuel into the combustion chamber when the engine operation is decelerated, and the engine does not have to be driven.

Figure 12:
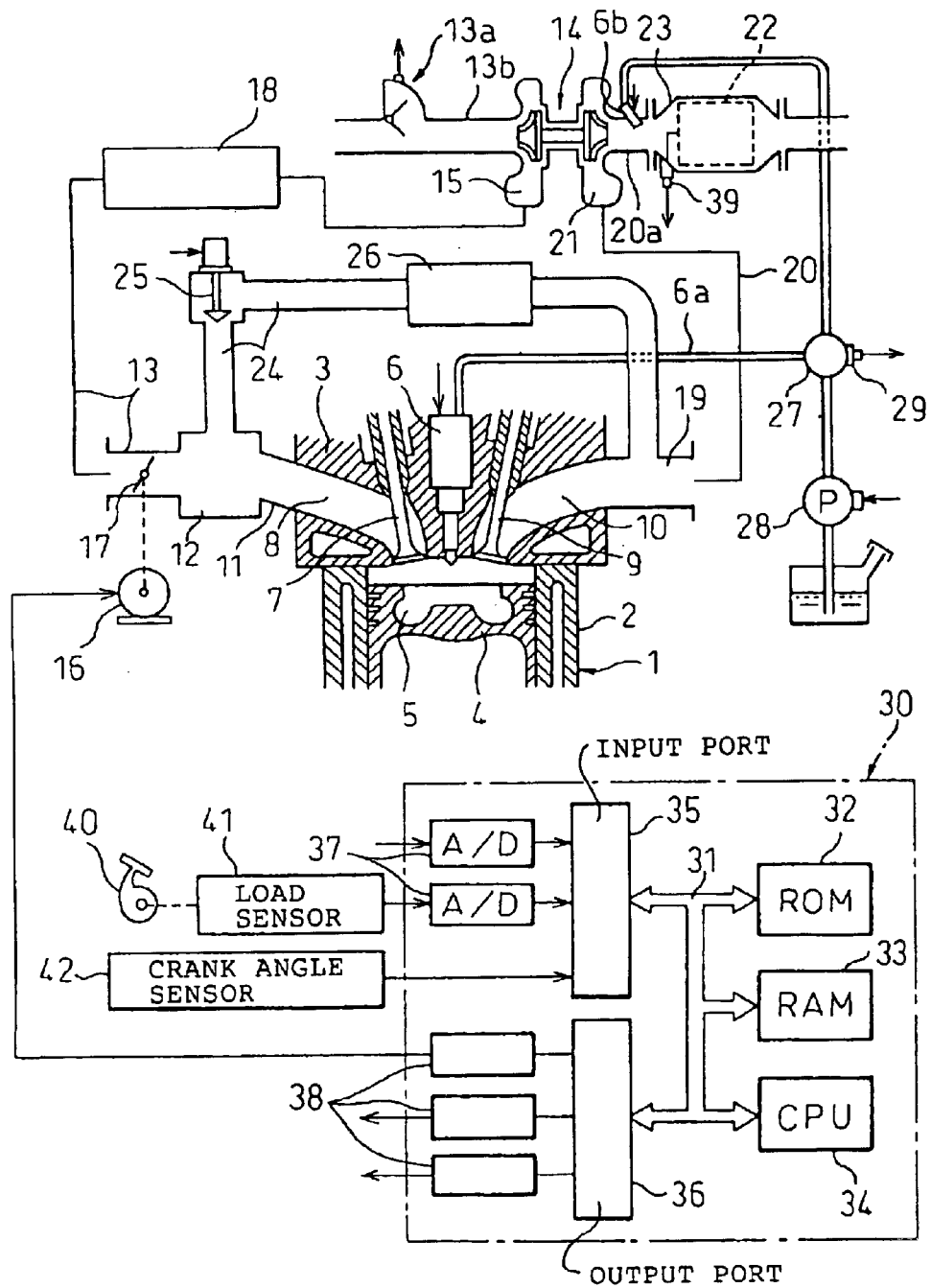
FIG. 12 is an overall view of the engine designed to perform further another exhaust gas pulsation method.

Further, alternatively, the exhaust gas may be largely pulsed by employing a method comprising steps of mounting a second fuel injector 6*b* for injecting a fuel between the exhaust turbine 21 and the particulate filter 22 as shown in FIG. 12, connecting the second fuel injector 6*b* to the common rail 27, and introducing the fuel into the exhaust gas, as another method. According to this, the fuel injected from the second fuel injector 6*b* burns by reacting on oxygen included in the exhaust gas, and thereby, the pressure of the exhaust gas is increased, and thus, the exhaust gas is largely pulsed. Noted that the second fuel injector 6*b* is connected to the output port 36 via a corresponding drive circuit 38.

Further, in case that the amount of oxygen included in the exhaust gas is not sufficiently large to burn the fuel injected from the second fuel injector 6*b*, an air injector may be arranged upstream of the second fuel injector 6*b* to introduce an air into the exhaust gas. Further, in case that the temperature of the exhaust gas is not sufficiently high to burn the fuel injected from the second fuel injector 6*b*, and ignition plug may be arranged downstream of the second fuel injector 6*b* to ignite the fuel included in the exhaust gas.

The above-explained methods, each of which uses the exhaust pulsation device, causes the exhaust gas to bypass the exhaust turbine, uses the sub fuel injection, advances the time to open the exhaust valve, uses the air injector, uses the ignition plug, and uses the second fuel injector, may be optionally combined, considering the actions and advantages thereof.

FIG. 13 shows an example of the routine to perform the above-explained process for removing depositing particulates.

Referring to FIG. 13, initially at step 200, it is judged if a pressure loss P due to the particulate filter 22 is larger than a predetermined level PTH (P>PTH). The pressure loss means the difference in the pressure between the pressure of the exhaust gas upstream of the particulate filter 22 and the pressure of the exhaust gas downstream of the particulate filter 22. When it is judged that P>PTH at step 200, it is presumed that the relatively large amount of particulates deposit in the fine holes of the partitions 54 of the particulate filter 22 since the pressure loss P is relatively large, and it is judged that it is necessary to remove the particulates by oxidation, and then, at step 201, an exhaust gas pulsation process is performed by performing one of the above-explained methods.

On the other hand, when it is judged that P≦PTH at step 200, it is determined that it is not necessary to perform the exhaust gas pulsation process and, then, the routine is ended.

Further, alternatively, in the arrangement that the plurality of the particulate filters 22 are arranged in parallel with each other as shown in FIG. 15, the exhaust gas may be pulsed by a method different from the above-explained method which uses the exhaust gas pulsation device 39*a*. That is, in this case, a shut off valve 22*a* is arranged upstream of each particulate filter 22*a*, and thus, by extremely quickly cyclically repeating the opening and closing of the certain shut off valves 22*a*, the amount of exhaust gas flowing into the particulate filters 22 arranged downstream of the remaining shut off valve 22*a* extremely quickly cyclically increases and decreases. Thereby, the exhaust gas is pulsed.

In the case, the amount of exhaust gas flowing into the certain particulate filters 22 is larger than the normal amount. Therefore, if the flow rate of the exhaust gas is too large, $NO_x$ may not be absorbed in the active oxygen release agent 61, or the particulates may not be trapped on the wall surfaces of the active oxygen release agent 61. To prevent this, it is desirable to repeat the opening and closing of the certain shut off valves 22*a* only when the engine operation is decelerated, and no component such as the particulates and $NO_x$ is included in the exhaust gas. That is, the exhaust gas should be pulsed only when the engine is decelerated, the certain shut off valves 22*a* are repeatedly opened and closed.

FIG. 16 shows an example of the routine to perform the process for fluidizing the depositing particulates in the above-explained arrangement shown in FIG. 15.

Referring to FIG. 16, initially, at step 300, it is judged if a pressure loss P due to each particulate filter 22 is larger than a predetermined level PTH (P>PTH). When it is judged that P>PTH at step 300, the routine proceeds to step 301 where it is judged if the engine operation is decelerated. When it is judged that the engine operation is decelerated at step 301, it is determined that it is permitted to perform the exhaust gas pulsation process and, then, at step 302, the exhaust gas pulsation process is performed to pulse the exhaust gas. On the other hand, when it is judged that P≦PTH at step 300, it is determined that it is not necessary to remove the depositing particulates by oxidation, and then, the routine is ended. Further, when it is judged that the engine operation is not decelerated at step 301, it is determined that the exhaust gas pulsation process should not be performed, and then, the routine is ended.

According to the second method comprising a step of reversing the flow direction of the exhaust gas, the exhaust gas having various flow directions impinges on the particulates depositing in the fine holes of the partitions 54. By this impingement of the exhaust gas, the particulates are forced to be desorbed from the wall surfaces defining the fine holes of the partitions 54, and then, move in the fine holes. There are various methods as a concrete method for reversing the flow direction of the exhaust gas, but two of them will be explained below as examples.

Figure 17A:
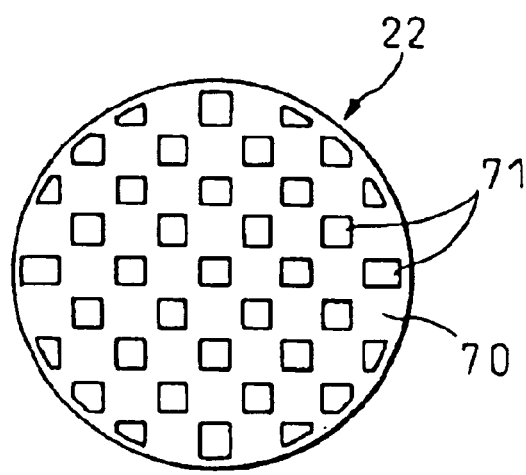
FIGS. 17A and 17B are views of a particulate filter.
Figure 17B:
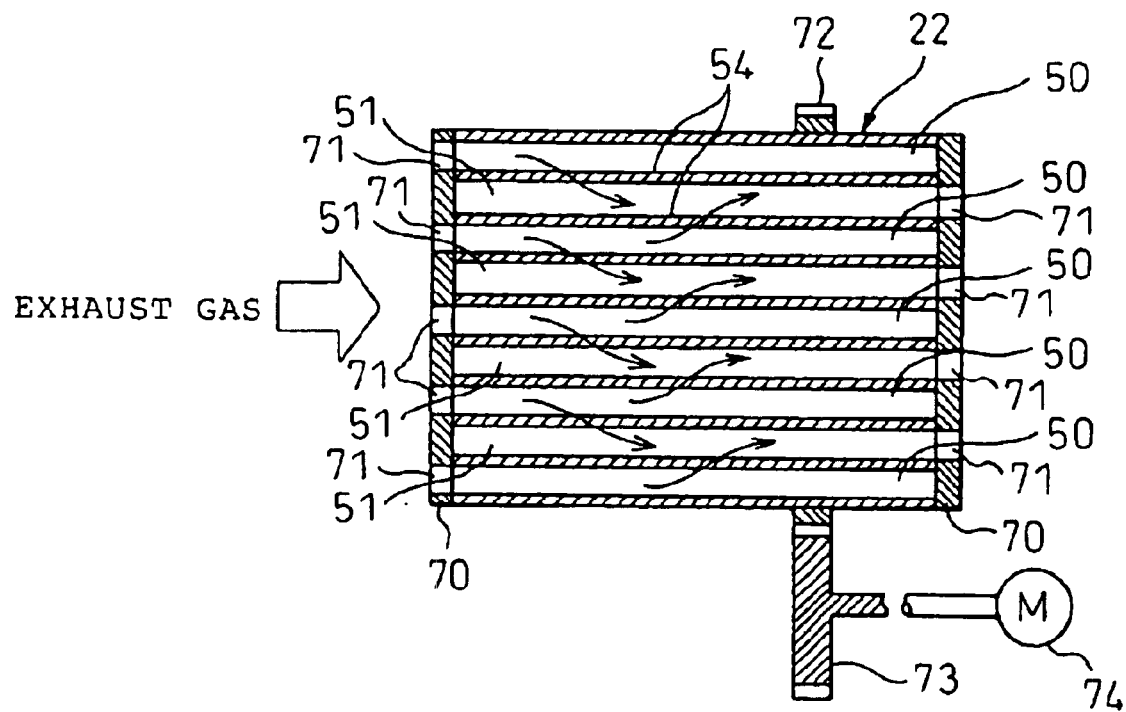

According to the first method, the flow direction of the exhaust gas is reversed without changing the exhaust gas inflow side of the particulate filter 22. To practice the first method, the particulate filter 22 is constructed as shown in FIGS. 17A and 17B. Referring to FIGS. 17A and 17B, ends of the exhaust circulation passages are closed by plates 70 shown in FIG. 17A in spite of the plugs 52, 53. A plurality of openings 71 are formed in the plates 70, and the plates 70 are arranged such that opposite ends of the particulate filter 22 are closed as shown in FIG. 17B. The plates 70 are not fixed to the opposite ends of the particulate filter 22, and only contact to the opposite ends of the particulate filter 22.

That is, the particulate filter 22 may move relative to the plates 70, independently of the plates 70. The exhaust circulation passages, which align with the openings 71 of one of the plates 70, correspond to the exhaust gas inflow passages 50, and the exhaust circulation passages, which align with the openings 71 of the other plate 70, correspond to the exhaust gas outflow passages 51. Each plate 70 is arranged on either side of the particulate filter 22 such that the exhaust gas inflow passages 50 and the exhaust gas outflow passages 51 are alternatively positioned, in other words, the exhaust gas inflow passage 50 is surrounded by four exhaust gas outflow passages 51, and the exhaust gas outflow passage 51 is surrounded by four exhaust gas inflow passages 50.

Further, a gear 72 is arranged on peripheral wall surface of the particulate filter 22, and is engaged with a gear 73. The gear 73 is connected to a motor 74, and may be rotated by the motor 74.

In the above-explained arrangement, when it is judged that it is necessary to fluidize the particulates in the fine holes of the partitions 54, the motor 74 is activated to rapidly rotate the particulate filter 22 relative to the plates 70, for example, by 90 degrees. By rotating the particulate filter 22, while the particulate filter is rotated, the exhaust gas flows into the exhaust circulation passages which normally correspond to the exhaust gas outflow passages. Therefore, the exhaust gas flows through the partitions 54 in a direction opposite to the normal direction for an extreme short time period. Thereby, the particulates are fluidized in the partitions 54.

Figure 18:
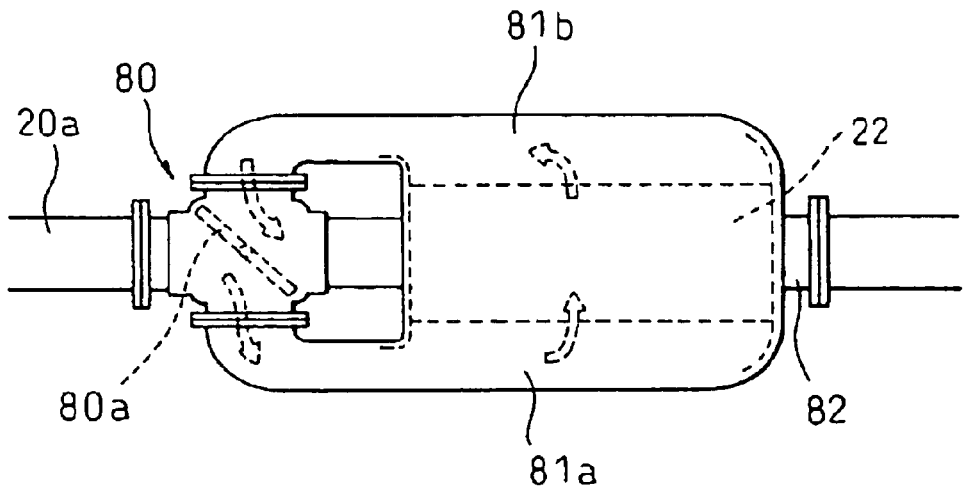
FIG. 18 is a plan view of another type of a particulate filter.
Figure 19:
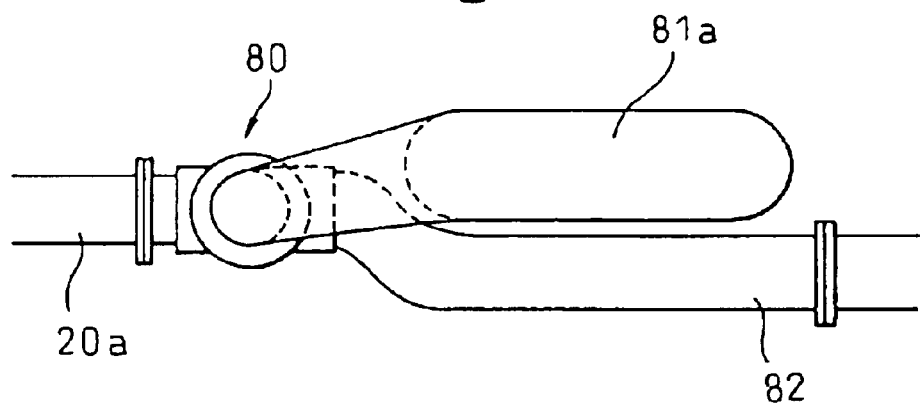
FIG. 19 is a side view of the another type of the particulate filter.
Figure 20:
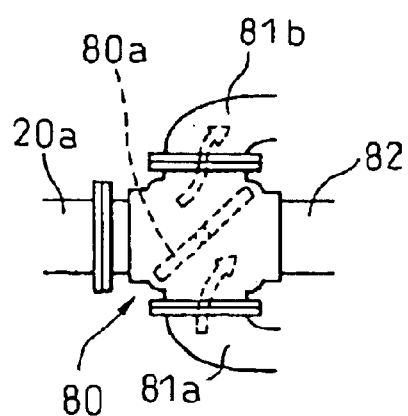
FIG. 20 is a plan view of a part of the another type of the particulate filter.

According to the second method, the flow direction of the exhaust gas is reversed by reversing the exhaust gas inflow side of the particulate filter 22. To practice the second method, for example, the particulate filter 22 is arranged as shown in FIGS. 18 to 20. Referring to FIGS. 18 and 19, the exhaust passage 20*a* is connected to an exhaust gas flow changing pipe 80. The pipe 80 has three openings, which are connected to a first exhaust pipe 81*a*, a second exhaust pipe 81*b*, and an exhaust pipe 82, respectively. The first exhaust pipe 81*a* is connected to one end of the particulate filter 22, and the second exhaust pipe 81*b* is connected to the other end of the particulate filter 22. For the convenience of the explanation, the end of the particulate filter 22 which the first exhaust pipe 81*a* is connected will be referred to as a first end, and the end of the particulate filter 22 which the second exhaust pipe 81*b* is connected will be referred to as a second end.

A changing valve 80*a* is arranged in the pipe 80. By adjusting the rotation position of the valve 80*a*, the pipe 80 introduces the exhaust gas from either of the different two ends, that is, the first and second ends of the particulate filter 22.

That is, when the valve 80*a* is positioned at a first rotation position as shown in FIG. 18, the exhaust gas flows from the pipe 80 through the first exhaust pipe 81*a* into the particulate filter 22 at the first end of the particulate filter 22, as shown by an arrow of FIG. 18. Then, the exhaust gas flows out of the second end of the particulate filter 22, and flows into the pipe 80 through the second exhaust pipe 81*b*. Finally, the exhaust gas exits from the pipe 80 to the exhaust pipe 82.

On the other hand, when the valve 80*a* is positioned at a second rotation position as shown in FIG. 20, the exhaust gas flows from the pipe 80 through the second exhaust pipe 81*b* into the particulate filter 22 at the second end of the particulate filter 22, as shown by an arrow of FIG. 20. Then, the exhaust gas flows out of the first end of the particulate filter 22, and flows into the pipe 80 through the first exhaust pipe 81*a*. Finally, the exhaust gas exits from the pipe 80 to the exhaust pipe 82.

In this way, the side into which the exhaust gas flows into the particulate filter 22 may be reversed by changing the rotation position of the changing valve 80*a*. If the rotation position of the valve 80*a* is changed, for example, at predetermined time intervals, the direction in which the exhaust gas flows through the partition 45 of the particulate filter 22 is periodically changed. Therefore, the particulates depositing on the wall surfaces defining the fine holes of the partitions 54 are fluidized in the fine holes. Thereby, the removal of the particulates in the partitions 54 by oxidation is promoted.

According to the third method using a physical vibration, the particulate filter 22 is physically vibrated, and thereby the depositing particulates are desorbed from the wall surfaces defining the fine holes of the partitions 54. This causes the particulates to move in the fine holes of the partitions 54. Various methods may be listed up as the method for physically vibrating the particulate filter 22, but, as an example, a following method will be explained.

Figure 21:
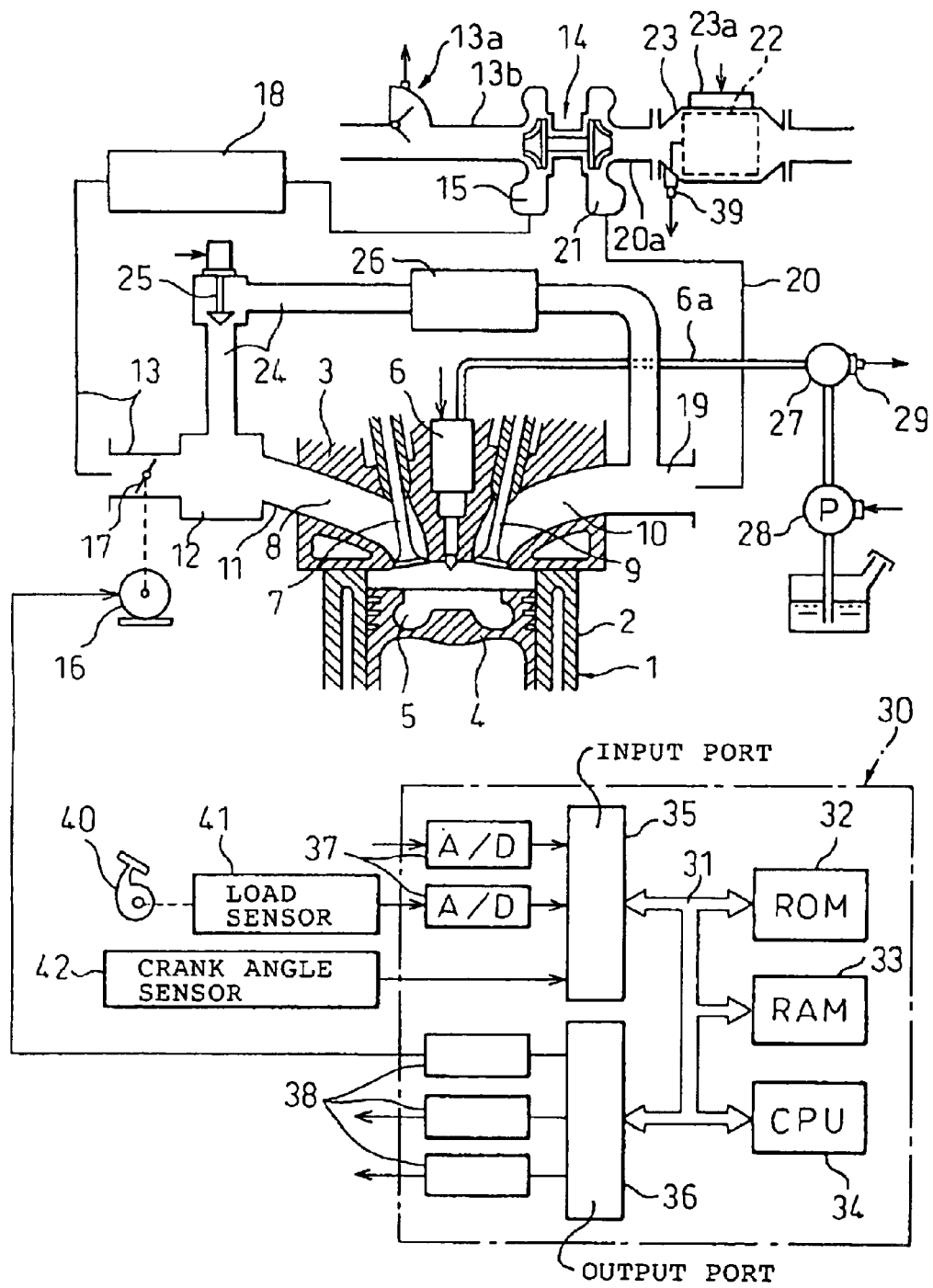
FIG. 21 is an overall view of the engine designed to physically vibrate the particulate filter.

As shown in FIG. 21, a vibration device 23*a* is arranged on the peripheral wall surface of the catalytic converter 23 and then, the converter 23 is vibrated by the device 23*a* and thereby, the particulate filter 22 is vibrated. A device using an ultrasonic vibrator or a motor-driven vibrator for vibrating may be employed as the vibration device 23*a*. Noted that the device 23*a* is connected to the output port 36 via a corresponding drive circuit 38.

Alternatively, in addition to the above-explained method for fluidizing the particulates, it may be employed to inject and burn the fuel for driving the engine in the several combustion chambers 5, thereby intentionally creating an imbalance in the engine combustion, thereby vibrating the engine itself, and thereby vibrating the converter 23.

Figure 22:
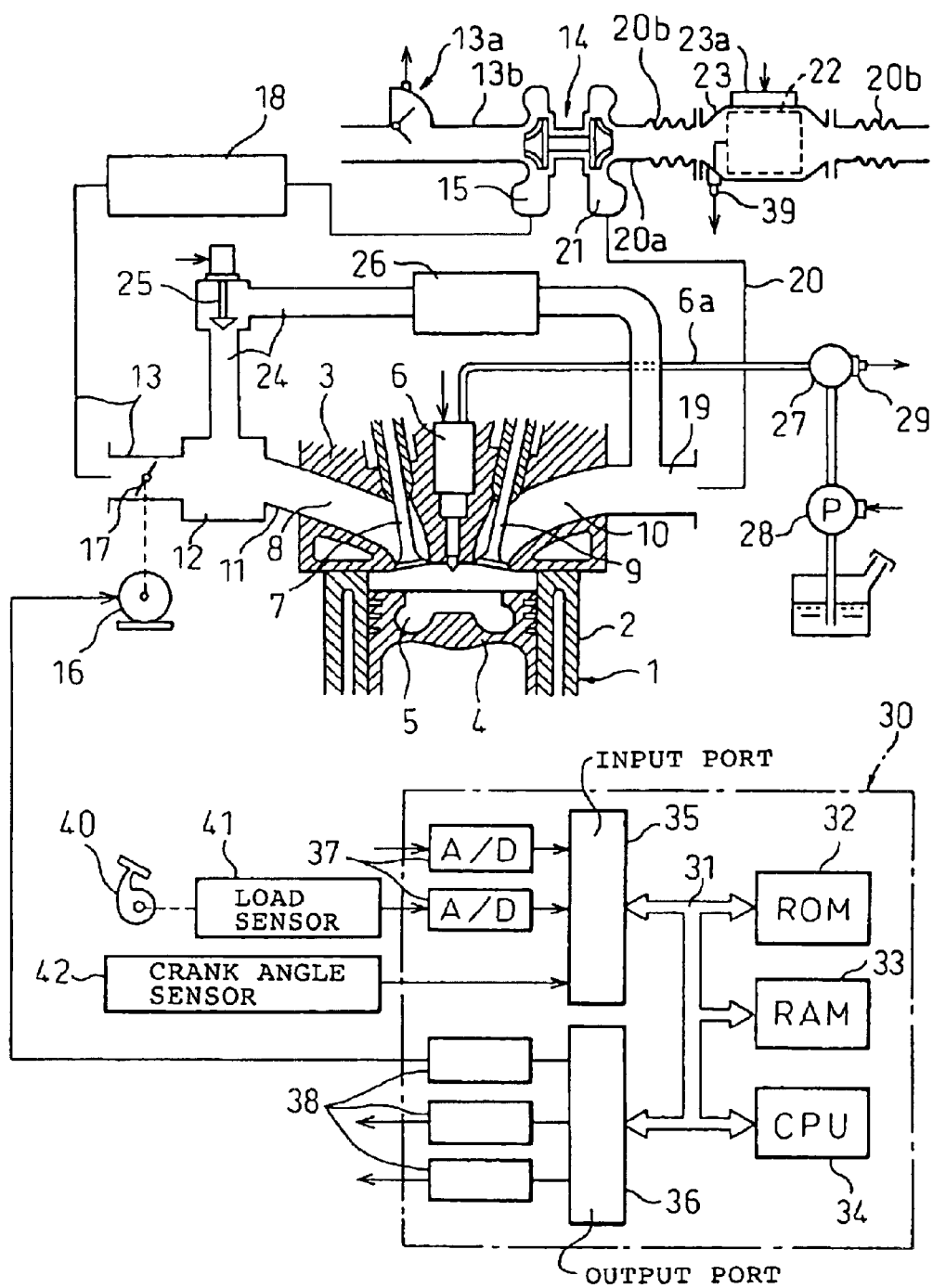
FIG. 22 is an overall view of another embodiment of the engine designed to physically vibrate the particulate filter.

Further, as shown in FIG. 22, in case that the vibration device 23*a* is used, it may be employed to support the converter 23 at the both ends thereof by flexible pipes 20*b*. According to this, the vibration of the converter 23 is enhanced, and thereby, the vibration of the particulate filter 22 is enhanced.

Any time may be employed as a time to perform a process (hereinafter, referred to as particulate fluidizing process) for fluidizing the particulates in the fine holes of the partitions as explained above, other than the above-explained time when the amount of particulates depositing in the fine holes of the partitions becomes larger than the predetermined amount. For example, the particulate fluidizing process may be performed when it is detected that the particulates deposit on the partitions. Alternatively, the particulate fluidizing process may be performed when it is expected that the particulates will deposit in the fine holes of the partitions. Further, it is expected that the particulates will deposit in the fine holes of the partitions, for example, when the temperature of the exhaust gas is relatively low, or when the amount of discharged particulates is large, or when the engine operation is accelerated, or when the engine operation is started. In these cases, the particulate fluidizing process is performed, independently of the amount of particulates depositing in the fine holes of the partitions. In this case, even if no particulate deposits in the fine holes of the partitions, the normal action of removal of the particulates by oxidation by the particulate filter 22 is not inhibited, but is enhanced since the particulates flowing into the fine holes of the partitions become likely to be distributed over the entire wall surfaces defining the fine holes.

Alternatively, a periodic time in which a certain state is satisfied may be employed as a time to perform the particulate fluidizing process. That is, the particulate fluidizing process may be performed at predetermined time intervals. For example, a time when a predetermined time period has elapsed, or when a mileage reaches a predetermined mileage, or when the engine operation is stopped. Of course, the particulate fluidizing process may be performed on a steady basis.

When the fine holes of the partitions of the particulate filter 22 at the upstream side which the exhaust gas enters are blocked by the particulates, the particulates do not flow into the downstream area of the fine holes any more. In this case, since the downstream wall surfaces defining the fine holes are not used to remove the particulates by oxidation, the amount G of particulates removable by oxidation by the particulate filter 22 totally becomes low. To prevent this, according to the invention, as shown in FIG. 14, the sizes of the fine holes 54a of the partitions 54 of the particulate filter 22 at the upstream side which the exhaust gas enters are larger than those at the downstream side which the exhaust gas exists. According to this, it is prevented that the downstream wall surfaces of the fine holes are not used to remove the particulates by oxidation due to the blocking of the upstream area of the fine holes 54a of the partitions 54. That is, according to this, the entire wall surface of the partitions 54 is effectively used to remove the particulates by oxidation.

Further, upon performing the above-explained exhaust gas pulsation method, when the amount of particulates depositing in the fine holes of the partitions 54 is very large, and thus, the fine holes are completely blocked, the exhaust gas is caused to flow into the particulate filter 22 at a pressure higher than the maximum pressure of the pulsed exhaust gas. Thereby, the particulates blocking the fine holes of the partitions 54 are forced to be moved in the partitions 54, and thus, the particulates may be removed by oxidation.

Of course, when the direction which the exhaust gas flows is reversed by the above-explained exhaust gas reversing method, the particulates blocking the fine holes of the partitions 54 are forced to be moved in the partitions 54 even if the amount of particulates depositing in the fine holes of the partitions 54 is very large.

Fuel or lubrication oil contains calcium Ca, and therefore, the exhaust gas contains calcium Ca. This calcium Ca produces calcium sulfate $CaSO_4$ in the presence of $SO_3$. This calcium sulfate $CaSO_4$ is a solid and will not break down by heat even at a high temperature. Therefore, if calcium sulfate $CaSO_4$ is produced, the fine holes of the particulate filter 22 are clogged by this calcium sulfate $CaSO_4$, as a result, the exhaust gas does not easily flow through the particulate filter 22.

In this case, however, if an alkali metal or an alkali earth metal having a higher tendency of ionization than calcium Ca, for example potassium K, is used as the active oxygen release agent 61, the $SO_3$ diffused in the active oxygen release agent 61 bonds with the potassium K to form potassium sulfate $K_2SO_4$, and then the calcium Ca passes through the partitions 54 of the particulate filter 22 and flows out into the exhaust gas outflow passage 51 without bonding with the $SO_3$. Therefore, there is no longer any clogging of fine holes of the particulate filter 22. Accordingly, as described above, it is preferable to use an alkali metal or an alkali earth metal having a higher tendency of ionization than calcium Ca, that is, potassium K, lithium Li, cesium Cs, rubidium Rb, barium Ba, and strontium Sr, as the active oxygen release agent 61.

Further, the present invention may apply to the case that only the precious metal such as platinum Pt is carried on the layer of the carrier which is formed on the both sides of the particulate filter 22. In this case, the solid line showing the amount G of particulates removable by oxidation slightly shifts to the right relative to the solid line shown in FIG. 5. In this case, the active oxygen is released from $NO_2$ or $SO_3$ carried on the face of the platinum Pt.

What is claimed is:

1. An exhaust gas purification device wherein a particulate filter for removing the particulates included in an exhaust gas discharged from a combustion chamber is arranged in an exhaust gas passage, the particulate filter has wall partitions, through which the exhaust gas flows, an oxidizing material for oxidizing the particulates is carried in the interior of the partitions, the particulates included in the exhaust gas are removed by oxidation in the interior of the partitions, and the device comprises means for desorbing and fluidizing the particulates held in the interior of the partitions.

2. An exhaust gas purification device as set forth in claim 1 wherein the oxidizing material is comprised of precious metal catalyst.

3. An exhaust gas purification device as set forth in claim 1 wherein the particulate fluidizing means fluidizes the particulates when it is expected that the particulates will deposit on the particulate filter.

4. An exhaust gas purification device as set forth in claim 1 wherein the particulate fluidizing means desorbs and fluidizes the particulates depositing in the partitions when it is detected that the particulates deposit on the particulate filter.

5. An exhaust gas purification device as set forth in claim 1 wherein the particulate fluidizing means fluidizes the particulates at predetermined time intervals.

6. An exhaust gas purification device as set forth in claim 1 wherein a plurality of the partitions are arranged in parallel with each other to form a plurality of exhaust circulation passages extending in parallel with each other in the particulate filter, one of the adjacent exhaust circulation passages is closed at an upstream end thereof by a plug and the other of the adjacent exhaust circulation passages is closed at a downstream end thereof by a plug.

7. An exhaust gas purification device as set forth in claim 1 wherein used is the particulate filter to remove the particulates included in the exhaust gas flowing into the particulate filter by oxidation without emitting a luminous flame when the amount of the particulates discharged from the combustion chamber per unit time is smaller than an amount of particulates removable by oxidation per unit time on the particulate filter without emitting a luminous flame, and to remove the particulates included in the exhaust gas flowing into the particulate filter by oxidation without emitting a luminous flame when the amount of discharged particulates becomes smaller than the amount of particulates removable by oxidation if an amount of particulates depositing on the particulate filter is smaller than a certain level even when the amount of discharged particulates becomes temporarily larger than the amount of particulates removable by oxidation, the amount of particulates removable by oxidation depends on a temperature of the particulate filter, means is provided for maintaining the amount of discharged particulates and the temperature of the particulate filter such that the amount of discharged particulates is normally smaller than the amount of particulates removable by oxidation and such that the amount of particulates depositing on the particulate filter is smaller than the certain level so as to remove the particulates by oxidation if the amount of discharged particulates becomes smaller than the amount of particulates removable by oxidation even when the amount of discharged particulates temporarily becomes larger than the amount of particulates removable by oxidation, thereby removing the particulates included in the exhaust gas by oxidation on the particulate filter without emitting a luminous flame.

8. An exhaust gas purification device as set forth in claim 1 wherein the partitions are formed from porous material.

9. An exhaust gas purification device as set forth in claim 8 wherein the average sizes of fine holes of the partitions at the exhaust gas inflow side are larger than those at the exhaust gas outflow side.

10. An exhaust gas purification device as set forth in claim 1 wherein the oxidizing material has a function to release an active oxygen therefrom.

11. An exhaust gas purification device as set forth in claim 10 wherein the oxidizing material has a function to absorb and hold an oxygen therein when excess oxygen is present in the surroundings, and release active oxygen therefrom when the particulates adsorb to the wall surfaces of the partitions.

12. An exhaust gas purification device as set forth in claim 10 wherein the oxidizing material has a function to absorb and hold oxygen therein if excess oxygen is present in the surroundings, and release the held oxygen in the form of active oxygen therefrom if a concentration of the oxygen in the surroundings falls.

13. An exhaust gas purification device as set forth in claim 12 wherein the particulates are oxidized by temporarily making an air-fuel ratio of a part or an entire of the exhaust gas rich.

14. An exhaust gas purification device as set forth in claim 12 wherein the oxidizing material is comprised of at least one of an alkali metal, an alkali earth metal, a rare earth, a transition metal, and a carbon family element.

15. An exhaust gas purification device as set forth in claim 14 wherein the alkali metal and alkali earth metal are comprised of metals higher in ionization tendency than calcium.

16. An exhaust gas purification device as set forth in claim 1 wherein the particulate fluidizing means fluidizes the particulates by vibrating the particulate filter.

17. An exhaust gas purification device as set forth in claim 16 wherein the particulate fluidizing means vibrates the particulate filter by an ultrasonic vibrator.

18. An exhaust gas purification device as set forth in claim 17 wherein the particulate fluidizing means supports the particulate filter such that the particulate filter can vibrate.

19. An exhaust gas purification device as set forth in claim 17 wherein the particulate fluidizing means vibrates the particulate filter by vibrating an engine.

20. An exhaust gas purification device as set forth in claim 1 wherein the particulate fluidizing means fluidizes the particulates by changing a flowing characteristic of the exhaust gas in the interior of the partitions.

21. An exhaust gas purification device as set forth in claim 20 wherein the particulate fluidizing means fluidizes the particulates by reversing a flow direction of the exhaust gas flowing in the interior of the partitions.

22. An exhaust gas purification device as set forth in claim 21 wherein the particulate fluidizing means reverses the flow direction of the exhaust gas flowing in the interior of the partitions without switching an exhaust gas inflow side of the particulate filter and an exhaust gas outflow side of the particulate filter.

23. An exhaust gas purification device as set forth in claim 21 wherein the particulate fluidizing means reverses the flow direction of the exhaust gas flowing in the interior of the partitions by switching an exhaust gas inflow side of the particulate filter and an exhaust gas outflow side of the particulate filter.

24. An exhaust gas purification device as set forth in claim 20 wherein the particulate fluidizing means fluidizes the particulates by pulsing the exhaust gas, and introducing the pulsed exhaust gas into the partitions.

25. An exhaust gas purification device as set forth in claim 10 wherein the device comprises a plurality of the particulate filters which are arranged parallel to each other, the particulate fluidizing means pulses the exhaust gas by decreasing an amount of the exhaust gas flowing into at least one of the particulate filters and increasing an amount of the exhaust gas flowing into the remaining particulate filters.

26. An exhaust gas purification device as set forth in claim 24 wherein the particulate fluidizing means pulses the exhaust gas by creating parts having different pressures in the exhaust gas.

27. An exhaust gas purification device as set forth in claim 26 wherein the particulate fluidizing means creates the parts having different pressures in the exhaust gas by supplying fuel and air into the engine exhaust passage and reacting the fuel with the air.

28. An exhaust gas purification device as set forth in claim 24 wherein the particulate fluidizing means pulses the exhaust gas by changing the operational parameters of an engine.

29. An exhaust gas purification device as set forth in claim 28 wherein the particulate fluidizing means changes the operational parameters of the engine to inject and burn additional fuel after the fuel for driving the engine is injected.

30. An exhaust gas purification device as set forth in claim 28 wherein the particulate fluidizing means changes the operational parameters of the engine to advance a time to open an exhaust valve.

* * * * *